(12) United States Patent
Ando et al.

(10) Patent No.: US 7,178,159 B1
(45) Date of Patent: Feb. 13, 2007

(54) INFORMATION PROVIDING APPARATUS

(75) Inventors: Atsushi Ando, Tokyo (JP); Toshimasa Takaki, Tokyo (JP); Toshio Oka, Tokyo (JP); Akino Inoue, Tokyo (JP); Tsutomu Uenoyama, Tokyo (JP); Daisaku Komiya, Tokyo (JP); Kazunori Yamada, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/559,159

(22) Filed: Apr. 26, 2000

(30) Foreign Application Priority Data

Apr. 27, 1999 (JP) ................................ 11-119444

(51) Int. Cl.
*H04N 5/445* (2006.01)
*H04N 7/16* (2006.01)
*G06F 3/00* (2006.01)

(52) U.S. Cl. .......................................... 725/43; 725/62

(58) Field of Classification Search ........ 725/143–146, 725/43, 61, 62; 348/441–452; 375/240.21
See application file for complete search history.

(56) References Cited

U.S. PATENT DOCUMENTS

| | | | |
|---|---|---|---|
| 5,767,845 A * | 6/1998 | Oashi et al. ............. | 715/500.1 |
| 5,867,208 A | 2/1999 | McLaren | |
| 5,973,755 A * | 10/1999 | Gabriel ...................... | 348/699 |
| 5,987,179 A * | 11/1999 | Riek et al. .................. | 382/236 |
| 6,470,378 B1 * | 10/2002 | Tracton et al. ............. | 709/203 |
| 6,496,980 B1 * | 12/2002 | Tillman et al. .............. | 725/90 |
| 6,499,057 B1 * | 12/2002 | Portuesi ..................... | 709/217 |
| 6,536,043 B1 * | 3/2003 | Guedalia ..................... | 725/90 |

FOREIGN PATENT DOCUMENTS

EP    0 402 954    12/1990

OTHER PUBLICATIONS

Peng, Zhong-Reninternet GIS and Its Application in Transportation, Mar.-Apr. 1998, pp. 4-7, http://www.uwm.edu/Dept/CUTS/peng/trnews.htm.*
Quicktime File Format Specification, May 1996, Developer Press, Apple Computer, p. 71.*

(Continued)

*Primary Examiner*—John Miller
*Assistant Examiner*—Hunter B. Lonsberry
(74) *Attorney, Agent, or Firm*—Pearne & Gordon LLP

(57) ABSTRACT

A system is arranged by a service providing apparatus 109 for storing a plurality of contents data 110 and capable of transmitting the contents data via network interfaces 116*a*/116*b* and a communication path 112; and also a service relaying apparatus 101 for producing compressed moving picture data having a high image quality from still picture data, and capable of transmitting the compressed moving picture data via network interfaces 115*a*/115*b* and another communication path 111 to a reproducing terminal 106. As a result, desirable contents data can be displayed by the reproducing terminal which owns a capability of displaying the compressed moving picture data, but does not own such a capability of displaying the desirable contents data.

17 Claims, 27 Drawing Sheets

OTHER PUBLICATIONS

Patent Abstracts of Japan, Picture Compression Data Processor and Picture Display Method, Dec. 1997.
Bhaskaran, V., Mediaprocessing in the Compressed Domain, Digest of Papers, Feb. 1996, pp. 204-209.
Bassil, J., Multimedia Over Mobile Networks Using The H.324 family, IEE Colloquium on the Future of Mobile Multimedia Communications, Dec. 1996, pp. 1-5.

Sellin, R., Neue Mobile Perspektiven MIT WAP, NTZ Nachrichtentechnische Zeitschrift, vol. 52, No. 11, Nov. 1999, pp. 50-53.
WO98/41022, Method and Apparatus for Still Picture Transmission and Display, Sep. 17, 1998.

* cited by examiner

FIG. 7

$F1 = I1$
$\quad = 1 - x1$  —————————— FORMULA 1
$\quad = R1$ $P1 = 1 - R1 - x2$
$\quad = x1 - x2$  —————————— FORMULA 2

$F2 = R1 + P1$
$\quad = 1 - x1 + x1 - x2$ —————————— FORMULA 3
$\quad = 1 - x2$
$\quad = R2$ $P2 = 1 - R2 - x3$
$\quad = x2 - x3$  —————————— FORMULA 4

$F3 = P2 + R2$
$\quad = x2 - x3 + 1 - x2$ —————————— FORMULA 5
$\quad = 1 - x3$ $x1 > x2 > x3$  —————————— FORMULA 6

INFORMATION PROVIDING APPARATUS

BACKGROUND OF THE INVENTION

The present invention is related to an information providing apparatus constituted by a computer, and a digital network such as a LAN (Local-Area Network) and a public telephone network.

Now, such an information providing apparatus will be considered. This information providing apparatus owns a client-server type structure. The client-server type structure is arranged by a personal computer, a digital network, and the like. The digital network corresponds to a LAN (Local-Area Network), a public telephone network, and the like. FIG. 28 shows a structural diagram of a general-purpose information providing apparatus.

In FIG. 28, reference numeral 2801 indicates a service providing apparatus, reference numeral 2802 represents a reproducing terminal, and reference numeral 2803 denotes a communication path.

The service providing apparatus 2801 is provided with a storage device having a large storage capacity and constructed of a hard disk unit and the like. The service providing apparatus 2801 stores contents data into this storage device, and transmits the contents data to the reproducing terminal 2802 in response to a request issued from the reproducing terminal 2802.

The reproducing terminal 2802 acquires desirable contents data from the service providing apparatus 2801 via the communication path 2803, reproduces the acquired desirable contents data, and then displays the reproduced desirable contents data. Apparently, the reproducing terminal 2802 is required to own a capability of decoding various data which constitute the contents data. As an example of the above-explained information providing manner, such contents data which is described by using the HTML (Hyper Text Markup Language) in the WWW (World Wide Web) is reproduced/displayed by way of "Internet Explorer" by Microsoft, which is widely utilized so as to view home pages on personal computers. In this case, generally speaking, a personal computer is used as this reproducing terminal 2802.

Since mobile appliances are nowadays popularized, the following information providing systems as the reproducing terminal 2802 may be expected in future. That is, this forthcoming information providing system employs a portable information terminal (PDA: Personal Digital Assistants), and a portable telephone. In general, performance capabilities of a CPU (central processing unit) and a storage device employed in this reproducing terminal 2802 are low, as compared with performance capabilities of personal computers. Although this reproducing terminal 2802 cannot hardly reproduce/display contents data described by using the HTML, various performance limitations should be given, for example, only character data may be displayed, and also black/white still picture image data may be displayed.

When newly developed mobile communication networks (IMT-2000: International Mobile Telecommunications-2000) using the W-CDMA (Wideband Code Division Multiple Access) system are popularized, the data transfer capability per unit time of the communication path 2803 may be improved, and contents data used to provide information may be widely changed such as still picture data made in a full color, and moving picture data combined with audio data.

For instance, the following idea is now considered. That is, a full-colored still picture compressed by the JPEG (Joint-photographic Experts Group) format (will be referred to as a "JPEG still picture" hereinafter) is displayed on a portable information terminal and a portable telephone. One realistic means may be conceived. That is, such a portable information terminal and/or a portable telephone is equipped with a function capable of decoding a JPEG still picture. However, this realistic means owns the bellow-mentioned several problems.

A first problem is given as follows:

A time period defined after a display request is issued and up to the display is accomplished is prolong. For example, a data amount of such a JPEG still picture which is made of 768 pixels (longitudinal direction)×1,024 pixels (lateral direction) and is taken by an electronic still camera is substantially equal to 100 K bytes. In this case, symbol "K" implies 1,024. In such a case that this JPEG still image is acquired via a mobile communication network having a data transfer capability of 64 Kbps (namely, 64,000 bits/second) and then is displayed on a portable telephone, an operator of this portable telephone must wait approximately 13 seconds until the picture data transfer operation is accomplished.

A second problem is given as follows:

That is, a total number of components of a portable information terminal and/or a portable telephone is increased. This is because that a decoder for a JPEG still picture and a storage device for temporarily storing a JPEG still picture must be provided in such a portable information terminal and/or a portable telephone. Also, since such a function is newly employed, power consumption is necessarily increased. To accept increased power consumption, a capacity of a battery must be increased. These restrictions can be hardly accepted by these terminals whose features are a compactness and light weight.

A third problem is given as follows:

That is, a portable information terminal and/or a portable telephone can be hardly operated by processing various sorts of contents data. Every time contents data having a new data format appears in the field, such a display function capable of displaying this newly formatted contents data must be provided in the portable information terminal and the portable telephone, resulting in a very difficult solution. In other words, it is practically very difficult to install such a necessary contents data reproducing software program in these portable information terminal and portable telephone every time newly formatted contents data is present. Such a program install work is generally carried out in personal computers.

SUMMARY OF THE INVENTION

An object of the present invention is to provide such a means capable of reproducing/displaying various sorts of contents data such as full-colored still picture data having a high image quality and three-dimensional (3D) computer graphics, while using a reproducing terminal such as a portable information terminal and a portable telephone. A data processing capability of this reproducing terminal is made lower than that of a personal computer, while this reproducing terminal does not own a capability of displaying image data such as a JPEG still picture.

To solve this problem, firstly, the present invention is directed to a service relaying apparatus. That is, the service relaying apparatus according to first invention acquires data from a service providing apparatus capable of storing a plurality of contents data and also capable of sending out contents data via a network interface in response to a request; and converts the format of the acquired data into such a format thereof that this acquired data can be reproduced without any problem even in a user environment (performance of reproducing terminal). Then, the information providing apparatus transmits the data with the converted format.

This service relaying apparatus, according to the first invention, comprises: picture data relaying means capable of utilizing contents data reproducing software operated on a general-purpose personal computer as reproducing means, and for relaying to moving picture coding means, still picture data originated from contents data which is obtained by reproducing the contents data acquired from the service providing apparatus via the network interface by this reproducing means; moving picture coding means for producing compressed moving picture data having a high image quality from the still picture image data by way of a stepwise image quality complementary type coding system, and for transmitting the compressed moving picture data via a second network interface to the reproducing terminal; and control means for determining an area of still picture data coded into the compressed moving picture data in response to a manipulation made from the reproducing terminal, and capable of notifying the determined area to the moving picture coding means.

As a result, the desirable contents data can be reproduced by such a reproducing terminal which owns the display capability of the compressed moving picture data, but does not have the capability of displaying the desirable contents data. In addition, the reproducing terminal can display an arbitrarily selected portion of contents data displayed on this reproducing terminal in an enlarging manner.

Also, secondly, in the service relaying apparatus according to the first invention, the control means may produce a control signal for changing a display state of the reproducing means by receiving a button manipulation made in the reproducing terminal, and then may transmit the produced control signal. Also, the control means may determine the area of the still picture data coded in the compressed moving picture data, and then may transmit the determined area to the moving picture coding means. The moving picture coding means produces compressed moving picture data from such still picture data, the content of which is sequentially changed by changing a setting condition, of coding process operation, if necessary.

As a result, the desirable contents data can be reproduced by such a reproducing terminal which owns the display capability of the compressed moving picture data, but does not have the capability of displaying the desirable contents data. In addition, the reproducing terminal can display an arbitrarily selected portion of contents data displayed on this reproducing terminal in an enlarging manner. Also, the reproducing terminal can display the relevant contents data by moving the displayed content along upper/lower directions and right/left directions, and by arbitrarily selecting the displayed link information.

Also, thirdly, in the service relaying apparatus according to the first invention, the moving picture coding means may also produce audio data having a designated data format from audio data contained in the contents data, may produce multiplexed AV data by multiplexing the compressed moving data with the audio data, and may transmit the multiplexed AV data via the second network interface to the reproducing terminal.

As a result, the desirable contents data can be reproduced by such a reproducing terminal which owns the display capability of the multiplexed AV data, but does not have the capability of displaying the desirable contents data, while reproducing the audio. In addition, the reproducing terminal can display an arbitrarily selected portion of contents data displayed on this reproducing terminal in an enlarging manner.

Also, fourthly, the present invention is directed to such an apparatus arranged by combining the service providing apparatus with the service relaying apparatus in an integral form, according to the first present invention.

As a result, the desirable contents data can be reproduced by such a reproducing terminal which owns the display capability of the compressed moving picture data, but does not have the capability of displaying the desirable contents data. In addition, the reproducing terminal can display an arbitrarily selected portion of contents data displayed on this reproducing terminal in an enlarging manner.

Also, fifthly, the present invention is directed to such an apparatus arranged by combining the service providing apparatus with the service relaying apparatus in an integral form, according to the second present invention.

As a result, the desirable contents data can be reproduced by such a reproducing terminal which owns the display capability of the compressed moving picture data, but does not have the capability of displaying the desirable contents data. In addition, the reproducing terminal can display an arbitrarily selected portion of contents data displayed on this reproducing terminal in an enlarging manner. Also, the reproducing terminal can display the relevant contents data by moving the displayed content along upper/lower directions and right/left directions, and by arbitrarily selecting the displayed link information.

Also, sixthly, the present invention is directed to such an apparatus arranged by combining the service providing apparatus with the service relaying apparatus in an integral form, according to the third present invention.

As a result, the desirable contents data can be reproduced by such a reproducing terminal which owns the display capability of the multiplexed AV data, but does not have the capability of displaying the desirable contents data, while reproducing the audio. In addition, the reproducing terminal can display an arbitrarily selected portion of contents data displayed on this reproducing terminal in an enlarging manner.

BRIEF DESCRIPTION OF THE PREFERRED EMBODIMENTS

FIG. 7 is a diagram for explaining an example of formulae indicative of a change in reproduced image qualities caused by a stepwise image quality complementary type coding process operation in the first embodiment mode of the present invention;

DETAILED DESCRIPTION OF THE PREFERRED EMBODIMENTS

Referring now to FIG. 1 to FIG. 27, various embodiment modes of the present invention will be described. It should be noted that the present invention is not limited only to these embodiment modes, but may be embodied in various modes without departing from the technical scope and spirit of the present invention.

Embodiment 1

A first embodiment mode of the present invention will now be described with reference to FIG. 1 to FIG. 11.

Figure 1:
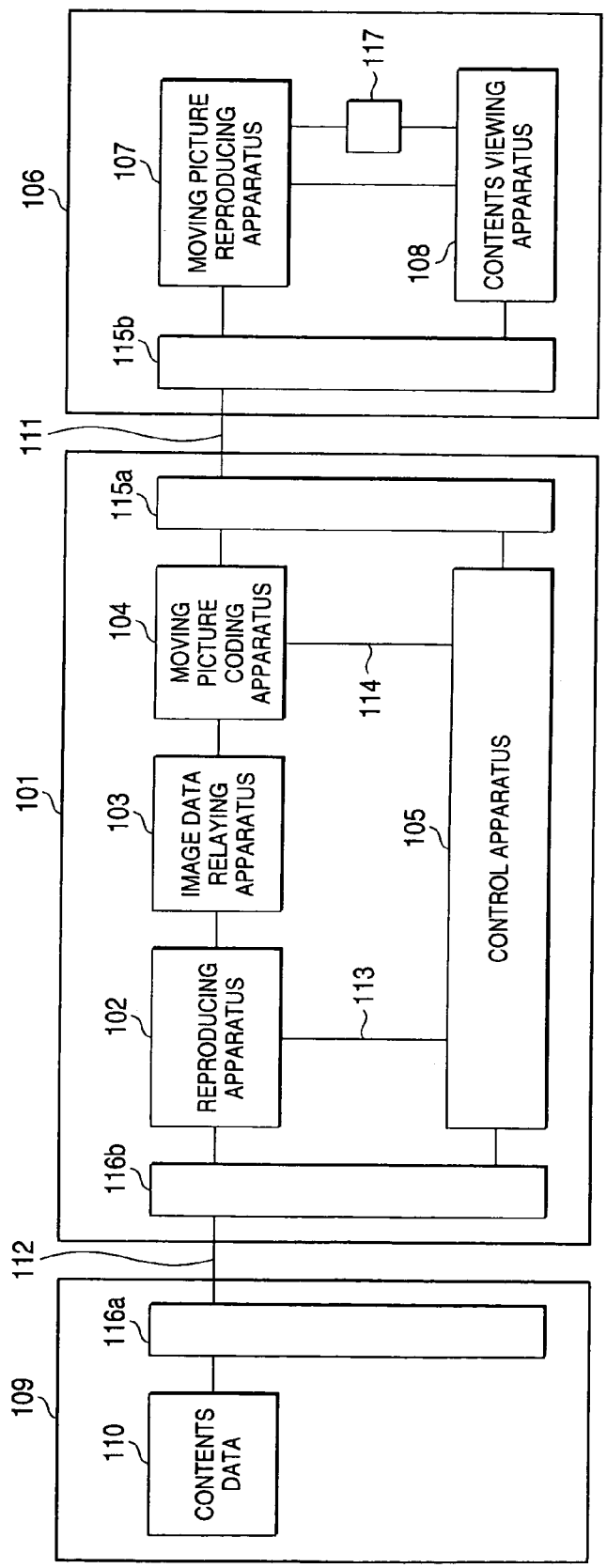
FIG. 1 is a structural diagram for showing a first embodiment mode of the present invention.

FIG. 1 represents a structural diagram of the first embodiment mode. In FIG. 1, reference numeral 101 shows a service relaying apparatus; reference numeral 102 indicates a reproducing apparatus; reference numeral 103 represents an image data relaying apparatus; reference numeral 104 shows a moving picture coding apparatus; and reference numeral 105 is a control apparatus. Also, reference numeral 106 shows a multimedia communication terminal functioning as a reproducing terminal; reference numeral 107 represents a moving picture reproducing apparatus; reference numeral 108 indicates a contents viewing apparatus; reference numeral 109 denotes a service providing apparatus; and reference numeral 110 is contents data. Also, reference numeral 111 shows a communication path between the terminal 106 and the service relaying apparatus 101; reference numeral 112 shows a communication path between the service providing apparatus 109 and the service relaying apparatus 101; reference numeral 113 represents a control signal of the reproducing apparatus 102; reference numeral 114 indicates a control signal of the moving picture coding apparatus 104; reference numerals 115a and 115b represent network interfaces provided in the service relaying apparatus 101 and the multimedia communication terminal 106, respectively; reference numerals 116a and 116b show network interfaces provided in the service relaying apparatus 101 and the service providing apparatus 109, respectively; and also reference numeral 117 denotes an operation button.

First, a description will now be made of usable modes directed to this embodiment mode.

The service providing apparatus 109 stores digital still pictures (will be referred to as "still pictures" hereinafter) as the contents data 110. The multimedia communication terminal (will be referred to as a "terminal" hereinafter) 106 acquires arbitrary contents data (namely, still picture in this case) with a format displayable on the own display means, and then displays this acquired arbitrary contents data thereon. A size of the terminal 106 is selected to be substantially equal to a typical size of a portable telephone. As a result, a display apparatus of this terminal 106 is a liquid crystal display (LCD), the screen size of which is small, for instance, on the order of 2 inches measured along a diagonal length.

On the other hand, as a still picture, image data photographed by a digital still camera and the like may be employed. A size of such a still picture would become very large, for example, 1,024 pixels×768 pixels, as compared with the dimension of the display apparatus employed in the terminal 106. When such a contents data 110 is displayed on the terminal 106, the entire area of the contents data 110 is first compressed and then, the compressed contents data is displayed. As apparent from the foregoing description, the entire image of the contents data displayed on the terminal 106 owns low visibility as to very small areas thereof. As a result, an arbitrary partial portion of the contents data 110 is enlarged by arbitrarily setting magnification by manipulating the operation button 117 equipped on the terminal 106 so as to display a detailed portion of this contents data 110.

Next, a description will be made of both operations of this embodiment mode and realizing means thereof.

The terminal 106 is provided with the moving picture reproducing apparatus 107, the contents data viewing apparatus 108, and the operation button 117. This terminal 106 performs such a communication standardized by a protocol designed to establish a communication path, for instance, recommendations H. 320, H. 323, H. 324 and the like of International Telecommunication Union-Telecommunication Sector (will be referred to "ITU-T" hereinafter).

The contents viewing apparatus 108 corresponds to such an apparatus for displaying the contents data 110 which is acquired from the service providing apparatus 109 via the service relaying apparatus 101, the communication path 111, and the communication path 112. Also, this contents viewing apparatus 108 decodes compressed moving picture data by using the moving picture reproducing apparatus 107 to display thereon the decoded moving picture data, if required. In addition, the contents viewing apparatus 108 provides a function for selecting the contents data 110 by using the operation button 117.

In this embodiment mode, the terminal 106 displays character data indicative of menu and the like, which is contained in the contents data 110, by using the own function of this contents viewing apparatus 108, and also displays the compressed moving picture data by using the moving picture reproducing apparatus 107.

The moving picture reproducing apparatus 107 decodes the compressed moving picture data and displays the decoded moving picture data under control of the contents viewing apparatus 108. In such a case that the compressed moving picture data under reception is stopped, the moving picture reproducing apparatus 107 stops the image display at this time, and maintains the display state during a time period until the compressed moving picture data is newly received.

The service relaying apparatus 101 corresponds to such an apparatus located at an intermediate position between the terminal 106 and the service providing apparatus 109. This service relaying apparatus 101 supplies the contents data 110 constituted by the character to the contents viewing apparatus 108. Also, the service relaying apparatus 101 converts such a contents data 110 which cannot be displayed on the contents viewing apparatus 108, into compressed moving picture data, and then transmits this converted compressed moving picture data to the moving picture reproducing apparatus 107.

Operations of the service relaying apparatus 101 will now be explained.

Figure 2:
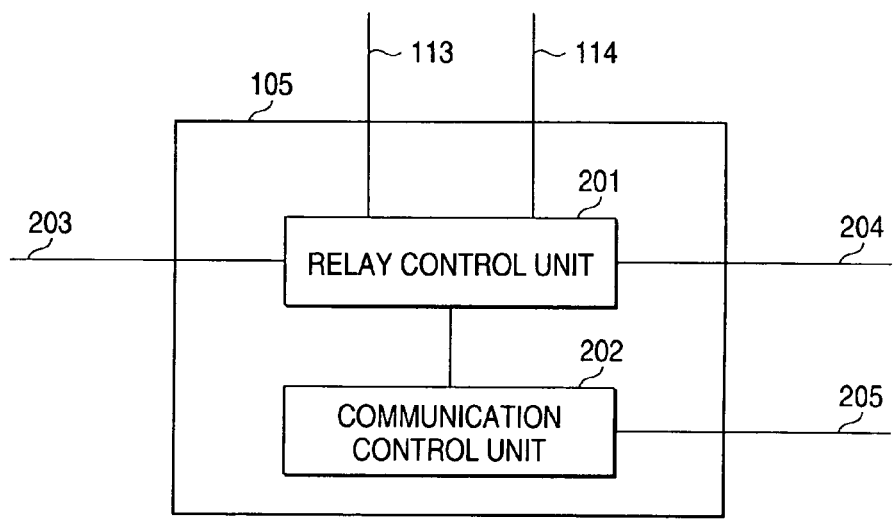
FIG. 2 is a structural diagram for indicating a control apparatus in the first embodiment mode of the present invention.

FIG. 2 shows an arrangement of the control apparatus 105 for controlling the service relaying apparatus 101. In FIG. 2, reference numeral 201 indicates a relay control unit, reference numeral 202 represents a communication control unit, reference numeral 203 indicates a communication path between this control apparatus 105 and the network interface 116b, and reference numerals 204 and 205 show communication paths between this control apparatus 105 and the network interface 115a.

The communication control unit 202 performs a basic control operation for communications between the terminal 106 and the service relaying apparatus 101 in accordance with a protocol used to establish a communication path, such as the communication control method defined based upon the recommendation H. 245 of ITU-T.

When the communication between the terminal 106 and the service relaying apparatus 101 is commenced, the communication control unit 202 obtains the data display capability of the terminal 106 by exchanging the capability based upon the protocol used to establish the communication path, and stores the acquired data display capability into a storage device provided inside this communication control unit 202 for a time period until the communication is ended. After the communication between the terminal 106 and the service relaying apparatus 101 is established by the communication control apparatus 202, a major function of the control apparatus 105 is provided by the relay control unit 201.

The relay control unit 201 directly converts the contents data 110, or converts this contents data 110 into compressed moving picture data by properly referring to the data display capability of the terminal 106 stored in the communication control unit 202, and then, transmits either the contents data 110 or the converted compressed moving picture data to the terminal 106.

When the contents data 110 saved in the service providing apparatus 109 is designated from the terminal 106, the relay control unit 201 derives the designated contents data 110 from the service providing apparatus 109 via the communication path 203 and the network interfaces 116a and 116b.

Next, if the contents viewing apparatus 108 of the terminal 106 is capable of displaying all data of the designated contents data 110, then the relay control apparatus 201 refers to the data display capability of the terminal 106 stored in the communication control unit 202, and directly transmits this designated contents data 110 via the communication path 204 to the terminal 106.

When the contents viewing apparatus 108 of the terminal 106 cannot display all data of the designated contents data 110, the relay control unit 201 controls both the reproducing apparatus 102 and the moving image coding apparatus 104 so as to convert the designated contents data 110 into compressed moving picture data, and then transmits the compressed moving picture data to the terminal 106.

When the contents viewing apparatus 108 of the terminal 106 is capable of displaying portional data of the designated contents data 110, the relay control unit 201 prompts the terminal 106 to select the display method.

In the case that the terminal 106 selects the display method by employing the contents viewing apparatus 108, the relay control unit 201 derives only such data displayable on the contents viewing apparatus 108 from the designated contents data 110, and then sends the derived data to the terminal 106.

In the case that the terminal 106 selects the display method by employing the moving picture reproducing apparatus 107, the relay control unit 201 converts the contents data 110 into compressed moving picture data, and then sends the compressed moving picture data to the terminal 106.

Now, a description will be made of a process operation for converting the contents data 110 into the compressed moving picture data and for transmitting the compressed moving picture data to the terminal 106. In this embodiment mode, the contents data 110 is assumed as still picture data with the JPEG (Joint Photographic Experts Group) format, whereas the reproducing apparatus 102 is assumed as software capable of displaying still picture data with the JPEG format, which is operated on a general-purpose personal computer.

The reproducing apparatus 102 derives the contents data 110 which is designated by the control signal 113 supplied from the relay control unit 201 provided in the control apparatus 105, from the service providing apparatus 109 via both the communication path 112 and the network interfaces 116*a* and 116*b*. Then, the reproducing apparatus 102 displays the derived contents data 110 on the image data relaying apparatus 103. It should be understood that the expression "display" implies the following fact. That is, the contents data 110 need not be actually displayed on a display unit, but the reproducing apparatus 102 transmits the contents data to an interface identical to a display unit (will be explained later).

The moving picture coding apparatus 104 derives still image data originated from the contents data 110 from the image data relaying apparatus 103 in response to the control signal 114 supplied from the relay control unit 201 provided in the control apparatus 105, produces compressed moving picture data from the still picture data, and then sends the produced compressed moving picture data via the communication path 111 and the network interfaces 115*a*/115*b* to the terminal 106.

In this case, both realizing means of the image data relaying apparatus 103 and operations thereof will now be explained.

The image data relaying apparatus 103 in accordance with the present invention is required to satisfy the below-mentioned two conditions.

As a first condition, the reproducing apparatus 102 can utilize commercially available contents reproducing software, for instance, a commercially available software product.

As one example, the contents data 110 used in this embodiment mode is still image data formed in the JPEG format. However, in an actual case, contents data having various sorts of formats may be handled as this contents data 110. For instance, a home page described by the HTML (Hyper Text Marking Language), and 3-dimensional computer graphics data described by the VRML (Virtual Reality Modeling Language) may be considered.

To accept such various sorts of contents data 110, a plurality of reproducing functions equal to a total sort number of contents data 110 must be provided with the reproducing apparatus 102. In this case, as a means for realizing the reproductions of the contents data 110 formed in the various formats, when the commercially available contents reproducing software such as commercially available software products, the service relaying apparatus 101 may be easily realized in low cost. Also, the service relaying apparatus 101 may quickly accept contents data 110 formed in a new format.

As a second condition, the contents data 110 displayed on the reproducing apparatus 102 is transmitted to the moving picture coding apparatus 104 without lowering the image quality of this contents data 110.

The image data relaying apparatus 103 according to this embodiment mode is realized by way of a video memory (will be referred to as a "V-RAM" hereinafter) employed in a general-purpose personal computer and the like. Since such a V-RAM is employed, the image data relaying apparatus 103 may provide the same interface as that of data display on the display device to the reproducing apparatus 102. This display device may be realized by a CRT (cathode-ray tube) used in a general-purpose personal computer. In other words, sending of the data to this interface may be considered as "display".

In addition, since an operating system (will be referred to as an "OS" hereinafter) generally used in a personal computer, for instance, "Windows-NT" marketed by Microsoft may provide a function capable of deriving data saved in a V-RAM with respect to an application program, the moving picture coding apparatus 104 is capable of easily acquire the still image data originated from the contents data 110 from the V-RAM by using this function.

Since the image data relaying apparatus 103 is realized by way of the V-RAM, the above-described two conditions can be satisfied without newly employing a special control program. In other words, since the still image data display software corresponding to the reproducing apparatus 102 displays the still picture on the display device such as a CRT (alternatively, data is sent to V-RAM, which can be equivalently recognized as "display" function), the still picture data originated from the contents data 110 can be transferred to the moving picture coding apparatus 104.

Subsequently, the moving picture coding apparatus 104 will now be described.

Figure 3:
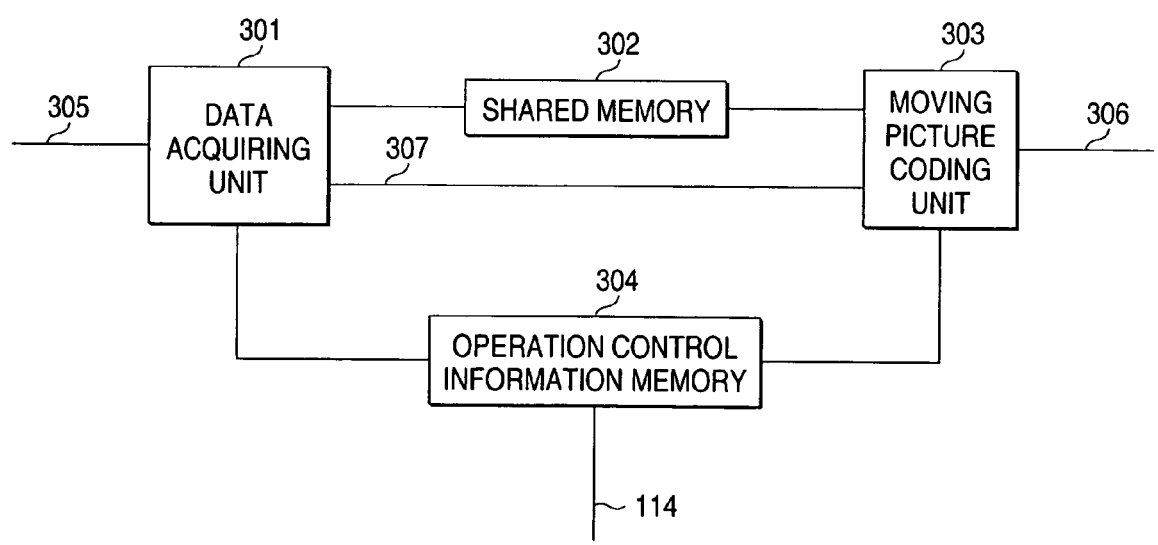
FIG. 3 is a structural diagram for representing a moving picture coding apparatus in the first embodiment mode of the present invention.

FIG. 3 represents an arrangement of the moving picture coding apparatus 104. In FIG. 3, reference numeral 301 shows a data acquiring unit; reference numeral 302 indicates a shared memory; reference numeral 303 represents a moving picture coding unit; reference numeral 304 indicates an operation control information memory; reference numeral 305 represents still image data supplied from the image data relaying apparatus 103; reference numeral 306 shows compressed moving image data; and reference numeral 307 indicates a control signal.

The moving picture coding apparatus 104 according to this embodiment mode owns the following two features.

A first feature is given as follows: That is, in such a case that still image data to be coded is changed like an animation while time has passed, this moving picture coding apparatus 104 performs the general-purpose moving picture coding operation. In the case that still picture data to be coded is not changed while time has passed like still picture data, the moving picture coding apparatus 104 performs the moving picture coding operation by way of the stepwise image quality complementing process operation, so that the still image data having a high image quality can be decoded.

A second feature is given as follows: The moving picture coding apparatus 104 adaptively changes a method for producing compressed moving picture data, for example, a filtering process operation executed before a coding operation, depending upon a characteristic of still picture data to be coded by the moving picture coding operation, for example, characteristics of a character, a natural image, and computer graphics, so that compressed moving picture data having a high image quality can be produced.

A description will now be made of operations of the moving image coding apparatus 104, and also means for realizing the above-described two features.

The information used to define operations of the moving picture coding apparatus 104 is stored via the control signal 114 into the operation control information memory 304. In this embodiment mode, the information stored in the operation control information memory 304 is given as follows:

A position of still picture data originated from the codable contents data 110 stored in the image data relaying apparatus 103, for example, an address of a pixel on the V-RAM at an upper left end of a rectangular area;

a dimension of still picture data originated from the contents data 110, for instance, a total pixel number along a horizontal direction and a total pixel number along a vertical direction;

a sort of still image data originated from the contents data 110, for example, a character, a natural image, computer graphics, and so on;

a position of an area which is actually coded within the still picture data originated from the contents data 110, for example, an address of a pixel on the V-RAM at an upper left edge of a rectangular area;

a dimension of an area which is actually coded within the still picture data originated from the contents data 110, for example, a total pixel number of a rectangular area along a horizontal direction and a total pixel number of the rectangular area along a vertical direction;

a bit number of compressed moving picture data per unit time (bit rate);

a frame number of compressed moving picture data per unit time (frame rate);

resolution of compressed moving picture data; and a mode of a coding process operation, namely either a stepwise image quality complementing mode or a normal moving picture mode, an operation permission flag of the moving picture coding apparatus 104, and so on.

Figure 4:
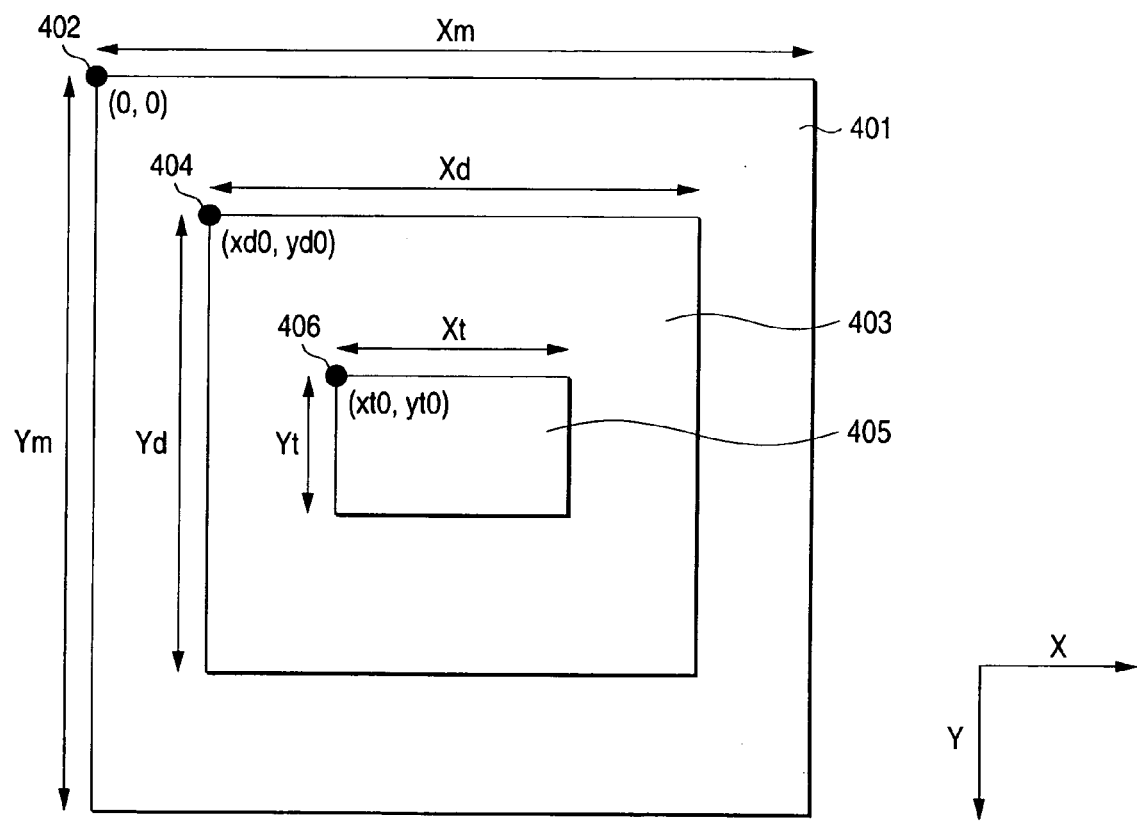
FIG. 4 is a schematic diagram for representing a relationship between display areas of contents in the first embodiment mode of the present invention.

FIG. 4 is a schematic diagram for representing a relationship among the respective areas stored in the operation control information memory 304. In FIG. 4, reference numeral 401 indicates a display memory area owned by the image data relaying apparatus 103; reference numeral 402 indicates an origin of the memory area 401; reference numeral 403 is still picture data originated from the codable contents data 110 displayed on the image data relay apparatus 103; reference numeral 404 shows a typical point for specifying the position of the still picture data 403 originated from the contents data 110; reference numeral 405 indicates an area which is actually coded within the still picture data 403 originated from the contents data 110; and reference numeral 406 shows a typical point for specifying a position of an area 405 which is actually coded.

Also, in FIG. 4, symbols Xm and Ym indicate a total pixel number of the display memory area 401 along a lateral direction, and a total pixel number of this display memory area 401 along a longitudinal direction.

Symbols Xd and Yd a total pixel number of the still picture data 403 along a lateral direction, and a total pixel number of this still picture data 403 along a longitudinal direction.

Symbol (xd0, yd0) represents a position of the typical point 404 within the display memory area 401.

Symbols Xt and Yt show a total pixel number of the coding area 405 along a lateral direction, and a total pixel number of this coding area 405 along a longitudinal direction.

Symbol (xt0, yt0) represents a position of the typical point 406 within the display memory area 401.

Figure 5:
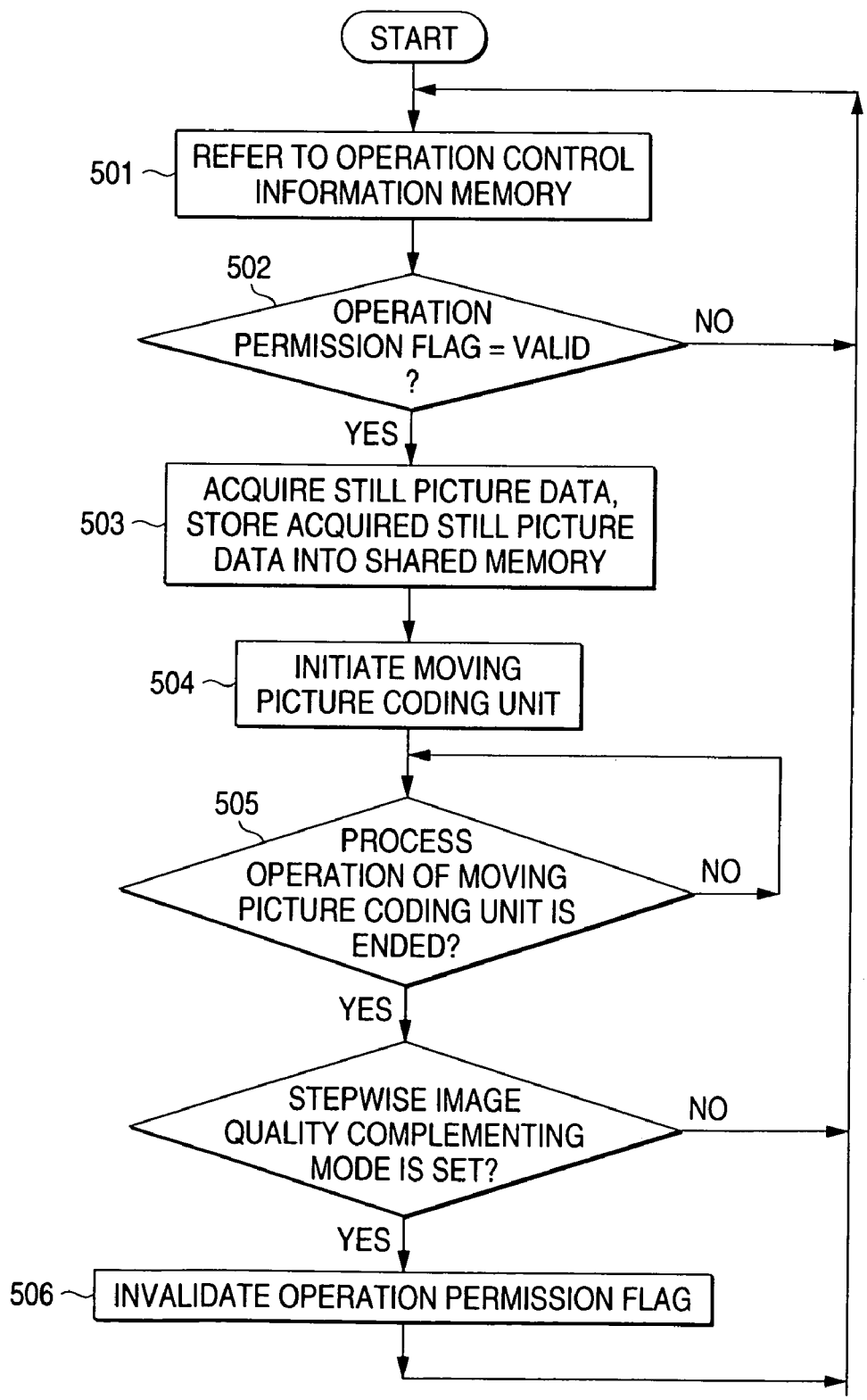
FIG. 5 is a flow chart for describing operations of a data acquiring unit in the first embodiment mode of the present invention.

FIG. 5 is a flow chart for representing operations of the data acquiring unit 301.

In response to a timer provided inside the data acquiring unit 301, this data acquiring unit 301 refers to the operation permission flag of the operation control information memory 304 every time a certain time period has passed (step 501). When the operation permission flag for permitting a production of compressed moving picture data is valid (step 502), the data acquiring unit 301 acquires still picture data from the image data relaying apparatus 103 based upon information related to still picture data to be coded which is stored in the operation control information memory 304 (step 503).

Next, the data acquiring unit 301 performs either the enlarging process operation or the compressing process operation with respect to the acquired still picture data based on the dimension/sort of the still image data stored in the operation control information memory 304, and the information related to the resolution of the compressed moving picture data, and then produces still picture data having predetermined resolution. Furthermore, the data acquiring unit 301 executes the filtering process operation in response to the sort of the still picture data, if necessary, and thus, performs the pre-process operation in order to acquire compressed moving picture data having a high image quality.

After such a process operation is carried out, the data acquiring unit 301 stores the resultant still picture data into the shared memory 302 (step 503), instructs the moving picture coding unit 303 to commence the coding process operation (step 504), and then waits that the coding process operation by the moving picture coding unit 303 is accomplished (step 505).

When the data acquiring unit 301 detects that the coding process operation by the moving picture coding unit 303 is accomplished, in the case that the operation mode corresponds to the stepwise image quality complementing mode, this data acquiring unit 301 invalidates the operation permission flag of the operation control information memory 304 (step 506), and thereafter, again commences the process operation defined at the step 501 in response to the timer operation.

In such a case that the coding process mode saved in the operation control information memory 304, the timer produces a signal in such a manner that a time period required for a series of process operations (defined from step 501 to step 505) executed by the data acquiring unit 301 is made coincident with the frame rate of the compressed moving picture data stored in the operation control information memory 504. In this case, the moving picture coding unit 303 produces/outputs video data of 1 frame every 1 time period. In other words, the frame rate of the compressed moving picture data is maintained by the data acquiring unit 301.

On the other hand, in the case that the coding process operation mode stored in the operation control information memory 304 corresponds to the stepwise image quality complementing mode, while the moving picture coding unit 303 maintains the frame rate of the compressed moving picture data stored in the operation control information memory 304, a plurality of frame data is produced by executing a stepwise image quality complementary type coding process operation.

Upon receipt of a process starting instruction issued from the data acquiring unit 301, the moving picture coding unit 303 produces/outputs desirable compressed moving picture data 306 with reference to such information related to a bit rate, a frame rate, and resolution of the compressed moving picture data stored in the operation control information memory 304. When the coding process operation is ended, the moving picture coding unit 303 notifies the completion of this coding process operation via the control signal 307 to the data acquiring unit 301.

When the coding process operation mode corresponds to the normal moving picture mode, the moving picture coding unit 303 performs the general-purpose moving picture coding operation. It should be understood that "general-purpose moving picture coding operation" implies a method of combining the intra frame coding method with the inter frame prediction coding method, for example, MPEG-1 type compressed moving picture data (Moving Picture Image Coding Experts Group-1: ISO/IEC 11172).

Figure 6B:
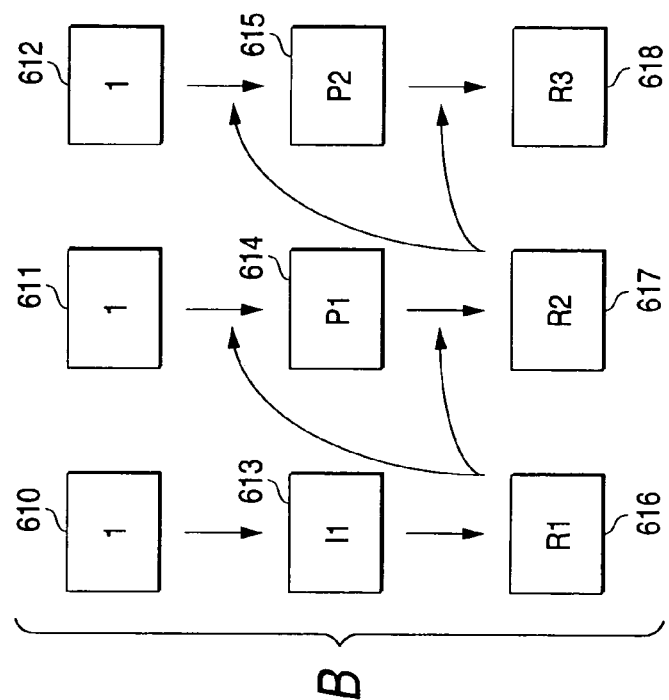
FIG. 6 is a conceptional diagram for representing an MPEG type video coding process operation in the first embodiment mode of the present invention.
Figure 6A:
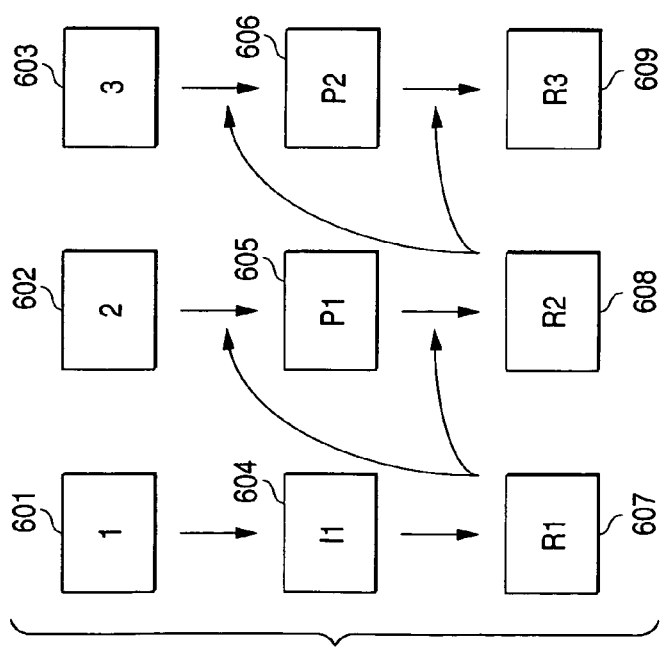

One of the features achieved in this embodiment mode is the coding operation of the moving picture coding unit 303 in such a case that the coding process mode corresponds to the stepwise image quality complementing mode. FIGS. 6A and 6B are conceptional diagrams for explaining the stepwise image quality complementary type coding process operation. Precisely speaking, FIG. 6A is a conceptional diagram for showing the moving picture coding process operation executed in the general MPEG-1 type coding process operation. FIG. 6B is a conceptional diagram for representing the stepwise image quality complementary type coding process operation.

In FIG. 6A, reference numerals 601, 602, 603 indicate non-compressed picture frames; reference numerals 604, 605, 606 represent compressed picture frames; and reference numerals 607, 608, 609 show reference picture frames.

In FIG. 6B, reference numerals 610, 611, 612 indicate non-compressed picture frames; reference numerals 613, 614, 615 represent compressed picture frames; and reference numerals 616, 617, 618 show reference picture frames.

In both FIG. 6A and FIG. 6B, the coding process operations are advanced from the left hand to the right hand while time has elapsed.

First, referring now to FIG. 6A, the moving picture coding process operation generally executed in the MPEG-1 type coding process operation will be summarized.

In the coding process operation with respect to the non-compressed image frame 601, the intra frame coding operation arranged by the discrete cosine transform (DCT) and the quantization is carried out. As a result, the compressed picture frame 604 is obtained. Next, the coding process operation is advanced to the non-compressed picture frame 602. As the coding operation of the non-compressed picture frame 602, the inter frame prediction coding operation is carried out. In this coding operation, a reference picture frame is required so as to perform a motion compensation process operation. In this case, as this reference picture frame, the reference picture frame 607 is employed which is produced from the previously acquired compressed picture frame 604. The motion compensation process operation is carried out between the non-compressed picture frame 602 and the reference picture frame 607 to thereby obtain the compressed picture frame 605. Next, the coding operation is advanced to the non-compressed picture frame 603. Similarly, when the non-compressed picture frame 603 is coded, the inter frame prediction coding operation is carried out. In this case, as this reference picture frame, the reference picture frame 608 is employed which is produced from the previously acquired compressed picture frame 605 and the reference picture frame 607. The motion compensation process operation is carried out between the non-compressed picture frame 603 and the reference picture frame 608 to thereby obtain the compressed picture frame 606. Subsequently, similar coding operations are repeatedly carried out.

Next, the stepwise image quality complementary type coding process operation will now be summarized with reference to FIG. 6B.

A major operation of this stepwise image quality complementary type coding process operation is identical to the moving picture coding process operation generally executed in the MPEG-1 type coding process operation. However, this stepwise image quality complementary type coding process operation owns such a different point, namely a non-compressed picture frame and a quantizing step value. When the coding process operation with respect to the non-compressed image frame 610, the intra frame coding operation is carried out, so that the compressed picture frame 613 is obtained. At this time, in order to reduce the data amount of the compressed image frame 613, a coarse (large) quantizing step value is employed.

Next, the coding operation is advanced to the non-compressed picture frame 611. Since the stepwise image quality complementary type coding process operation is directed to such data having no temporal change such as still picture data, as the non-compressed picture frame 611 employed in this coding process operation, the same data as the non-compressed picture frame 610 is employed. This is one of the different points in comparison with the moving picture coding process operation generally executed in the MPEG-1 type coding operation. As the coding operation of the non-compressed picture frame 611, the inter frame prediction coding operation is carried out. In this coding operation, a reference picture frame is required so as to perform a motion compensation process operation. In this case, as this reference picture frame, the reference picture frame 616 is employed which is produced from the previously acquired compressed picture frame 613. The motion compensation process operation is carried out between the non-compressed picture frame 611 and the reference picture frame 616 to thereby obtain the compressed picture frame 614. Since the same data as the non-compressed picture frame 610 is employed as the non-compressed picture frame 611, it is already known that a motion vector between the non-compressed picture frame 611 and the reference picture frame 616 is zero. As a result, no search is made of the motion vector, but the quantizing process operation is carried out with respect to a difference between the non-compressed picture frame 611 and the reference picture frame 616. At this time, as a quantizing step value, a fine (small) quantizing step value is used, as compared with the above-explained quantizing step value used when the compressed picture frame 13 is produced. As a result, it is possible to obtain such a non-compressed picture frame 614 having more precise information than that of the compressed picture frame 613.

Next, the coding process operation is advanced to the non-compressed picture frame 612. When the non-compressed picture frame 612 is coded, the inter frame prediction coding operation is similarly carried out. In this case, as this reference picture frame, the reference picture frame 617 is employed which is produced from the previously acquired compressed picture frame 614 and the reference picture frame 616. The non-compressed picture frame 610 is also the same as the non-compressed picture frame 612, and a similar coding process operation is carried out when the compressed picture frame 614 is produced, so that the compressed picture frame 615 is obtained. It should be noted that as a quantizing step value, a more precise (smaller) quantizing step value is employed, as compared with that used to previously obtain the compressed picture frame 614. As a result, this compressed picture frame 615 may become such a compressed picture frame having more precise information, as compared with that of the previously acquired compressed picture frame 614.

Subsequently, while the quantizing step value is gradually made finer (smaller), a similar coding process operation is repeatedly carried out. At such a time instant when the quantizing step value may become sufficiently precise, this coding process operation is accomplished.

A description will now be made of such a condition that the image quality is gradually improved in the stepwise image quality complementary type coding process operation by employing formulae. FIG. 7 describes a series of formulae. It should be noted that expressions of the respective items shown in FIG. 7 are originated from FIG. 6B.

A reproduced picture frame F1 obtained from the first compressed picture frame 613 may be expressed by way of a formula 1. In this formula 1, symbol "x1" indicates a deterioration component of an image quality caused by a quantizing error, and symbol "R1" shows the reference picture frame 616. Precisely speaking, since the reproduced picture frame F1 and the reference picture frame R1 are processed by way of the decoding process such as the inverse DCT process in the different apparatuses, this reproduced picture frame F1 is not made equal to this reference picture frame R1. However, since a difference between the reproduced picture frame F1 and the reference picture frame R1 gives no adverse influence to the essential point of this formula explanation, this difference is neglected. This fact may be similarly applied to a relationship between a reproduced picture frame F2 and the reference picture frame R2.

The second compressed picture frame 614, namely "P1" shown in FIG. 7 may be expressed by a formula 2. Symbol "x2" indicates a deterioration component of an image quality caused by a quantizing error. A reproduced picture frame F2 obtained from the second compressed picture frame 614 may be expressed by a formula 3.

The third compressed picture frame 615, namely "P2" shown in FIG. 7 may be expressed by a formula 4. Symbol "x3" indicates a deterioration component of an image quality caused by a quantizing error. A reproduced picture frame F3 obtained from the third compressed picture frame 615 may be expressed by a formula 5.

Since the quantizing step values employed when the respective compressed picture frames are produced are gradually made finer (smaller), the deterioration components x1, x2, x3 of the image quality caused by the respective quantizing errors may be expressed by such a relationship of a formula 6. As a consequence, the quantizing error occurred when the quantizing step value becomes sufficiently finest (smallest) is negligible. As a result, the image quality of the resulting reproduced picture frame is extremely approximated to the non-compressed image frame 610.

In addition, as to the data amounts of the compressed picture frames 614 and 615 obtained by executing the inter frame prediction coding operation, since the quantizing step value is properly selected, these data amounts may be controlled so as to obtain desirable bit rates.

Since the still picture data is converted into the compressed moving picture data by employing the above explained method, the image quality of the converted compressed moving picture data can be made very close to the image quality of the original picture.

All of the information stored in the operation control information memory 304 may be rewritten at an arbitrary time instant via the control signal 114. Both the data acquiring unit 301 and the moving picture coding unit 303 acquire the information stored in the operation control information memory 304 every time one unit of the process operation is carried out, and may change a detailed process operation based upon this acquired information.

Next, a description will now be made of a method for displaying partial data of the contents data 110 in an enlarge manner.

Figure 8:
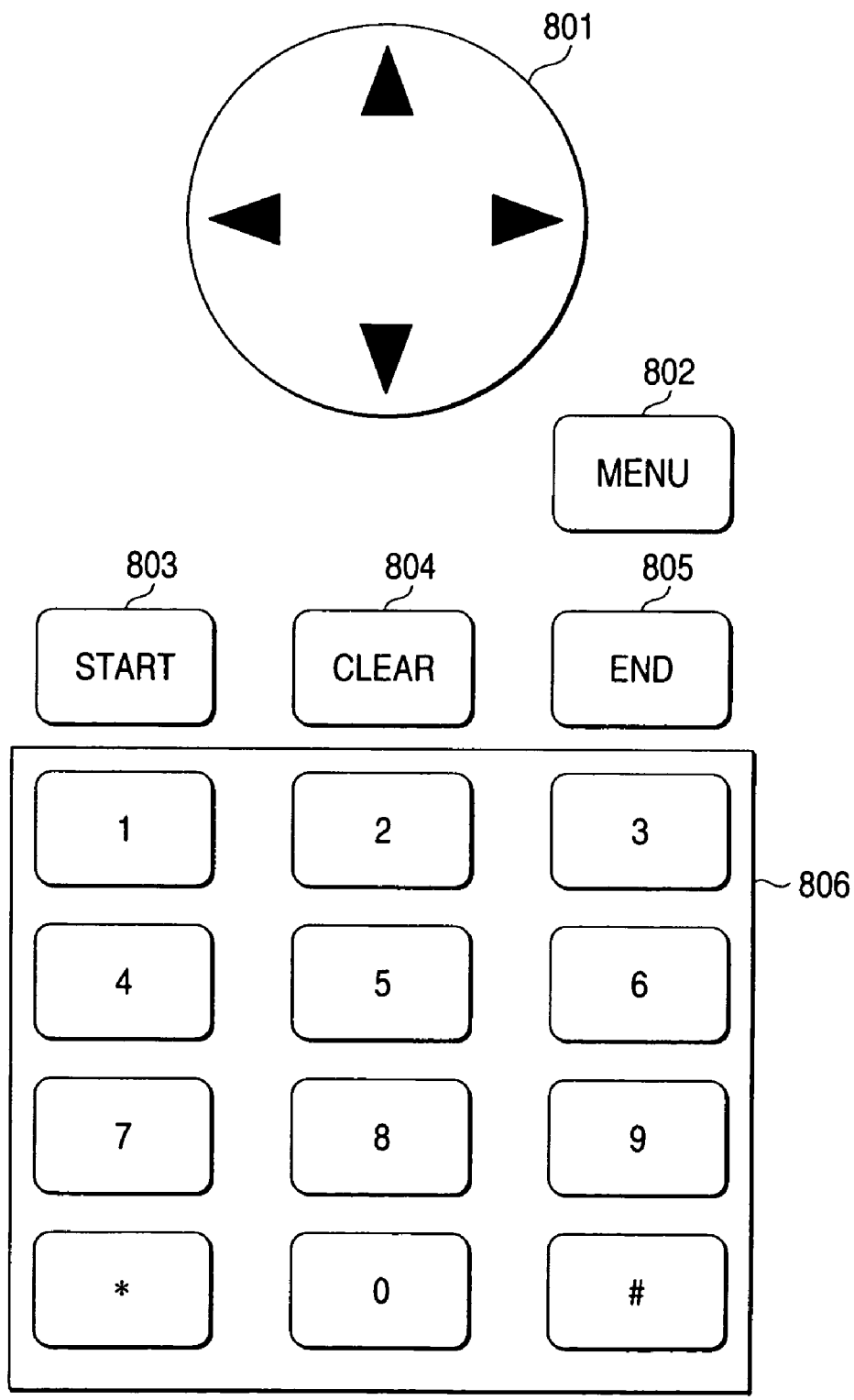
FIG. 8 is a structural diagram for showing an operation button 117 in the first embodiment mode of the present invention.

FIG. 8 illustratively represents a structure of the operation button 117 of the terminal 106. In FIG. 8, reference numeral 801 shows a direction button for instructing upper-lower-right-left directions, reference numeral 802 shows a menu button, and reference numeral 803 indicates a start button. Also, reference numeral 804 denotes a clear button, reference numeral 805 is an end button, and reference numeral 806 represents a dial button constituted by numerals "0" to "9", a symbol "*", and another symbol "#". When the respective buttons are depressed, signals are produced in correspondence with the respective button.

FIG. 9 is a display example of a still picture equal to the contents data 111 in the terminal 106. In FIG. 9, reference numeral 901 shows a rectangular frame indicative of an area which is displayed in an enlarge manner, reference numeral 902 represents a rectangular frame indicative of a first desirable area which is displayed in an enlarge manner, and reference numeral 903 shows a rectangular frame indicative of a second desirable area which is displayed in an enlarge manner.

Referring now to FIGS. 9A to 9G, a description will be made of a button operation example and a display condition example in the case that partial data of the contents data 110 is displayed in an enlarge manner.

Figure 9A:
FIG. 9 is a diagram for representing an example of still pictures to a terminal in the first embodiment mode of the present invention.

FIG. 9A shows an example in such a case that the contents data 110 (namely, will picture in this embodiment) stored in the service providing apparatus 109 is displayed in an original size.

Figure 9B:

FIG. 9B indicates an entire area of the contents data 110 displayed on the display unit of the terminal 106. In other words, the entire area of the still picture is reduced in correspondence with the dimension of the display unit of the terminal 106 to be displayed thereon. In this embodiment mode, it is assumed that this condition is an initial condition of the still picture display.

Figure 9C:
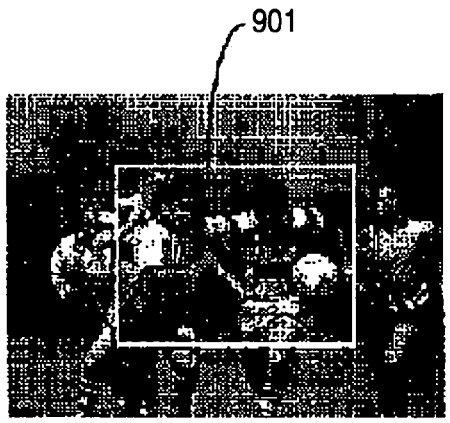

FIG. 9C shows a display condition established just after the direction button 801 is depressed to designate any one of the upper-lower-right-left direction after the initial condition. Reference numeral 901 is a rectangular frame indicative of an area which is displayed in an enlarge manner. This rectangular frame 901 is automatically deleted in such a case that after the direction button 801 is depressed, either this direction button 801 is not further depressed or the start button 803 is not depressed for a preselected time period, for example, 3 seconds. The display and the deletion of the rectangular frame are performed by the terminal 106 itself in response to the depression of the operation button 117.

Figure 9D:
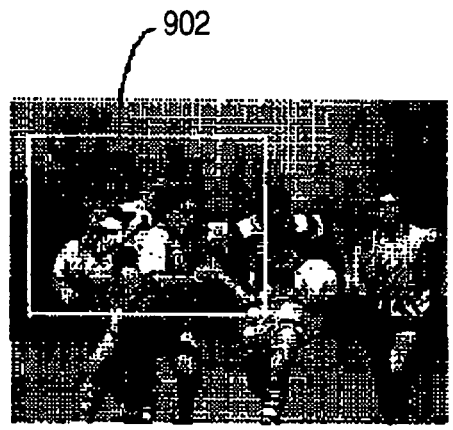

FIG. 9D indicates such a display condition that after the direction button 801 is depressed to display the rectangular frame 901, the direction button 801 is subsequently depressed arbitrary times to move this rectangular frame 901 to the desirable are 902 to be enlarged.

Figure 9E:

FIG. 9E shows such a display condition that the area 902 to be enlarged is designated by the rectangular frame 901, and this area 902 is displayed in an enlarge manner by depressing the start button 803.

Figure 9F:
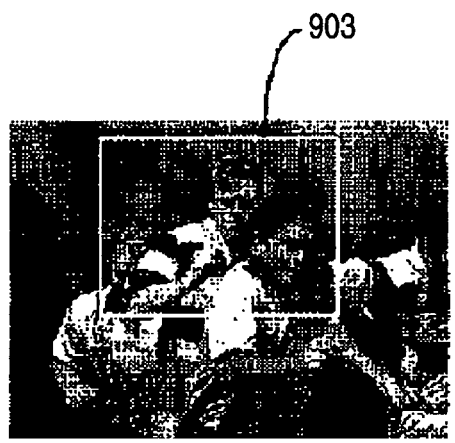

FIG. 9F shows such a display condition that the direction button 801 is further depressed to display the rectangular frame 901, and the desirable display area 903 to be enlarged is designated.

Figure 9G:

FIG. 9G indicates such a display condition that the display area 903 is displayed in an enlarge manner.

A portion of the contents data 110 displayed on the terminal 106 is displayed in an enlarge manner by performing the above-explained button operation.

Subsequently, a means for realizing such an enlarging display will now be explained.

After the direction button 801 is depressed arbitrary times from the initial condition as shown in FIG. 9($b$) so as to designate a desirable display area to be enlarged, when the start button 803 is depressed, the moving picture reproducing apparatus 107 sends a position and a size of a designated area on the display device of the terminal 106 to the relay control unit 201.

The relay control unit 201 calculates a position and a size of such an area of the contents data 110, which is newly coded, based upon both the position/size of the designated area supplied from the terminal 106. Then, the relay control unit 201 updates the relevant information stored in the operation control information memory 304, namely the position/size of the area which is actually coded within the bit map data, and furthermore, valids the operation permission flag.

The moving picture coding apparatus 104 produces new compressed moving picture data in accordance with this updated information of the operation control information memory 304. As a result, the terminal 106 can enlarge the desirable display area.

It should also be noted that the format of the compressed moving picture data which may be handled by the moving picture coding apparatus 104 and the moving picture reproducing apparatus 107, according to this embodiment mode, is assumed by the standardization of the MPEG-4 standard (ISO/IEC 14496). Alternatively, the moving picture coding apparatus 104 and the moving picture reproducing apparatus 107 may utilize such compressed moving picture data which is obtained by the coding system made by combining the intra frame coding system with the inter frame prediction coding system, for instance, MPEG-1 (ISO/IEC 11172), MPEG-2 (ISO/IEC 13818), and recommendation H.261 and H.263 of ITU-T.

Figure 10:
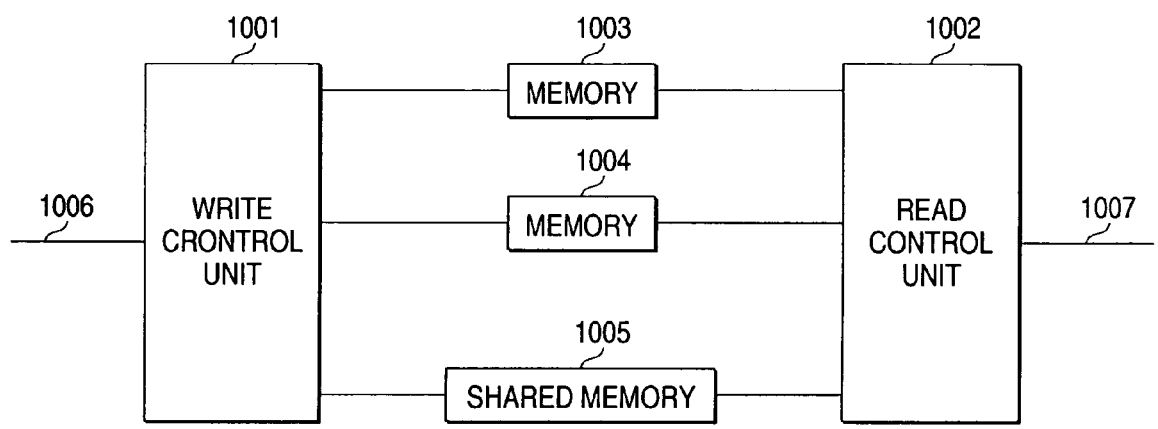
FIG. 10 is a structural diagram for showing a picture data relaying apparatus by using a semiconductor memory such as a DRAM in the first embodiment mode of the present invention.

Also, in the image data relaying apparatus 103 according to this embodiment mode, the video memory (V-RAM) may be replaced by a semiconductor memory such as a DRAM, and also a storage apparatus such as a magnetic disk apparatus. FIG. 10 is a structural diagram of an image data relaying apparatus with employment of a semiconductor memory such as a DRAM.

In FIG. 10, reference numeral 1001 shows a write control unit, reference numeral 1002 indicates a read control unit, reference numerals 1003 and 1004 represent memories separately provided from each other, and reference numeral 1005 shows a shared memory. Also, reference numeral 1006 indicates a signal line used to still picture data originated from the contents data 110 supplied from the reproducing apparatus 102, and reference numeral 1007 shows a signal line used to still picture data originated from the contents data 110 sent to the moving picture coding apparatus 104.

The shared memory 1005 stores thereinto use conditions of the memory 1003 and of the memory 1004 at the present time instant. This shared memory 1005 can be read/written by both the write control unit 1001 and the read control unit 1002.

The write control unit 1001 recognizes such a memory (either memory 1003 or memory 1004) into which the still picture data can be written by referring to the shared memory 1005, and then writes the still picture data derived from the reproducing apparatus 102 via the signal line 1006 into this recognized memory.

The read control unit 1002 recognizes such a memory (either memory 1003 or memory 1004) into which the latest readable still picture data is stored by referring to the shared memory 1005, and reads the still picture data from this recognized memory, and then, transfers the read still picture data via the signal line 1007 to the moving picture coding apparatus.

The write control unit may provide such an interface that this interface may functions as a display apparatus such as a video memory with respect to the reproducing apparatus 102. As a consequence, a commercially available still picture display unit may be used as the reproducing apparatus 102.

It should also be understood that the picture data relaying apparatus 103 may be realized by employing only one of the memory 1003 and the memory 1004 shown in FIG. 10. Alternatively, this picture data relaying apparatus 103 may be realized by employing more than 3 sets of memorys having similar functions to the function of either the memory 1003 or the memory 1004 indicated in FIG. 10.

As previously explained, in accordance with this embodiment mode, since the contents data saved in the service providing apparatus 109, namely the still picture data formatted by the JPEG system is converted into the compressed moving picture data by the service relaying apparatus 101, this still picture can be displayed by employing the terminal 106 which does not have the still picture display function.

Also, since the compressed moving picture data is produced by the stepwise image quality complementing method, the still picture can be displayed with having the high image quality substantially equal to the original image quality, namely, similar image qualities as that of the acquired contents data 110 is reproduced/transferred by the reproducing apparatus 102. Also, since the data amount of this compressed moving picture data is smaller than that of the JPEG type still image data, it is possible to shorten the waiting time for the completion of the data transfer operation, and the contents data can be quickly displayed on the terminal 106.

Furthermore, since the video memory (V-RAM) is employed in the image data relaying apparatus 103, the commercially available still picture display software such as a commercial software product can be utilized, and also such a service relaying apparatus 101 adapted to various data formatted contents data 110 can be readily realized. Also, since such a semiconductor memory as a DRAM is employed in the image data relaying apparatus 103, the display memory area 401 can be increased as compared with that achieved when the V-RAM is used. As a result, contents data having larger capacities can be displayed, which may improve practical merits.

Embodiment 2

A second embodiment mode of the present invention will now be described with reference to FIG. 11 to FIG. 15.

Figure 11:
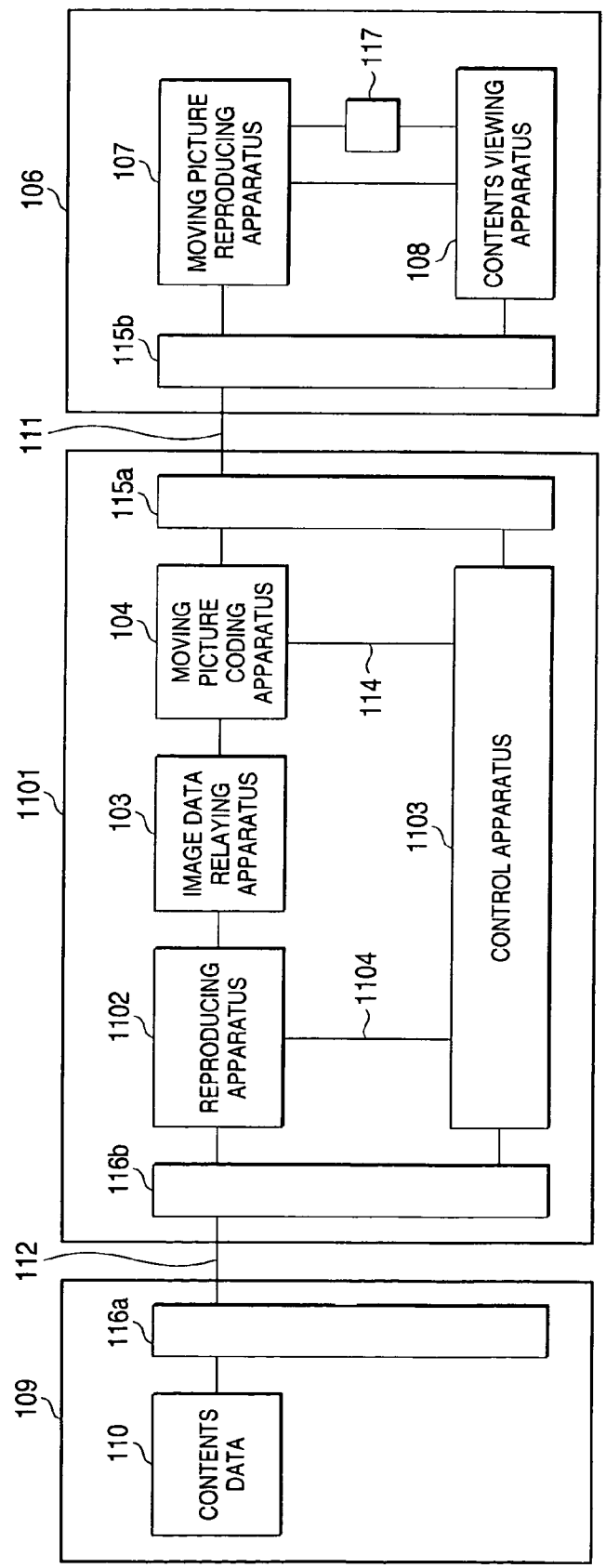
FIG. 11 is a structural diagram for showing a second embodiment mode of the present invention.

FIG. 11 represents a structural diagram of the second embodiment mode. In FIG. 11, reference numeral 1101 shows a service relaying apparatus; reference numeral 1102 shows a reproducing apparatus; and reference numeral 1103 is a control apparatus. Also, reference numeral 1104 shows a control signal of the reproducing apparatus 1102. Other structural elements of the second embodiment mode are identical to those of the first embodiment mode. A major different point between the arrangement of the second embodiment mode and the arrangement of the first embodiment mode is both the reproducing apparatus 1102 and the control apparatus 1103 in the service relaying apparatus 1101.

First, a description will now be made of usable modes directed to this embodiment mode.

Although the terminal 106 is identical to the terminal 106 employed in the first embodiment mode, the contents data 110 displayed on this terminal 106 is different from each other. The contents data 110 expected in the second embodiment mode is a home page described by the HTML (Hyper Text Markup Language), and is constituted by character data and still picture data. When such a contents data 110 is displayed on the terminal 106, then entire area of the contents data 110 is first compressed and then, the compressed contents data is displayed. As apparent from the foregoing description, the entire image of the contents data displayed on the terminal 106 owns low visibility as to very small areas thereof. As a result, an arbitrary partial portion of the contents data 110 is enlarged by arbitrarily setting magnification by manipulating the operation button 117 equipped on the terminal 106 so as to display a detailed portion of this contents data 110. In addition, a home page under display is moved along upper/lower/right/left directions, and also other home pages related to the first-mentioned home page by an URL (Universal Resource Locator) are selected/displayed by the operation button 117.

Next, a description will be made of both operations of this embodiment mode and realizing means thereof.

As the reproducing apparatus 1102, home page viewing software generally operated on personal computers, for example, "Internet Explorer" of Microsoft corporation is used.

Figure 12:
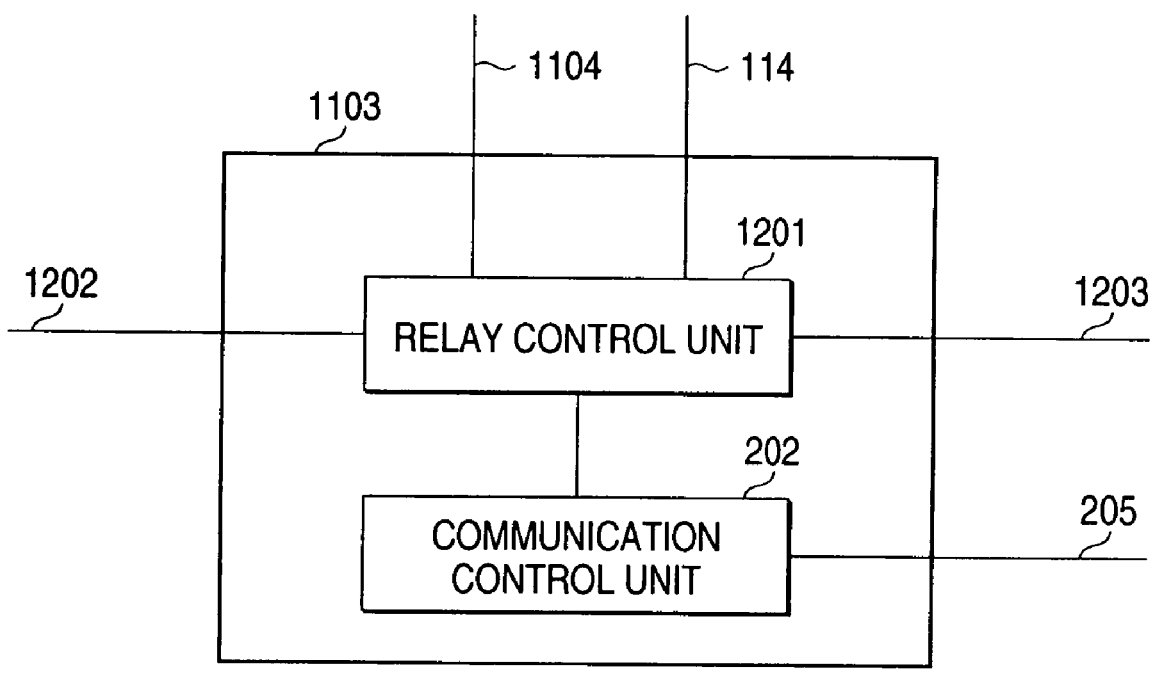
FIG. 12 is a structural diagram for indicating a control apparatus in the second embodiment mode of the present invention.

Next, the control apparatus 1103 will now be explained. FIG. 12 shows an arrangement of the control apparatus 1103. In FIG. 12, reference numeral 1201 indicates a relay control unit, reference numeral 1202 indicates a communication path between this control apparatus 1103 and the network interface 116*b*, and reference numeral 1203 shows a communication path between this control apparatus 1103 and the network interface 115*b*. Other structural elements of the second embodiment mode are identical to those of the control apparatus 105 according to the first embodiment mode.

The communication control unit 202 performs a basic control operation for communication between the terminal 106 and the service relaying apparatus 1101. After the communication between the terminal 106 and the service relaying apparatus 1101 is established by the communication control unit 202, a major function of the control apparatus 1103 is provided by the relay control unit 1201. Similar to the above-explained first embodiment mode, the relay control unit 1201 selects data to be sent to the terminal 106, namely selects either character data or compressed moving picture data.

Now, a description will be made of a process operation for converting the contents data 110 into the compressed moving picture data and for transmitting the compressed moving picture data to the terminal 106.

The reproducing apparatus 1102 derives the contents data 110 which is designated by the control signal 1104 supplied from the relay control unit 1201 provided in the control apparatus 1103, from the service providing apparatus 109 via both the communication path 112 and the network interfaces 116*a* and 116*b*. Then, the reproducing apparatus 1102 displays the derived contents data 110 on the image data relaying apparatus 103.

The moving picture coding apparatus 104 derives still image data originated from the contents data 110 from the image data relaying apparatus 103 in response to the control signal 114 supplied from the relay control unit 1201 provided in the control apparatus 1103, produces compressed moving picture data from the still picture data, and then sends the produced compressed moving picture data via the communication path 111 and the network interfaces 115*a*/115*b* to the terminal 106.

As a major display operation executed by the terminal 106 according to the second embodiment mode with respect to the contents data 110, namely, the home page described by the HTML, the entire area of the contents data 110 is displayed and an arbitrary data portion thereof are displayed in an enlarge manner; the contents data 110 is moved along the upper/lower/right/left directions (scroll display); and the display content of the contents data 110 is changed based upon the link information (URL) contained in the content data 110.

Next, operations for performing various display operations and realizing means thereof according to this embodiment mode will now be described.

Since both the entire display of the contents data 110 and the arbitrary partial data portion displayed in the enlarge manner are the same display method for the contents data 110 described in the first embodiment mode, descriptions thereof are omitted.

A description will now be made of operations and realizing means, according to this embodiment mode, for moving the contents data 110 along the upper/lower/right/left directions.

The relay control unit 1201 saves such information related to the contents data 110 which has been stored in the operation control information memory 304 employed in the moving picture coding apparatus 104 in an internal storage unit (not shown in detail) thereof. In other words, this relay control unit 1201 saves;

a position (xd0, yd0) and a dimension (Xd, Yd) of the codable still picture data 403 stored in the picture data relaying apparatus 103, and a position (xt0, yt0) and a dimension (Xt, Yt) of the area 405 which is actually coded within the still picture data 403; and in addition, a total pixel number indicative of 1 move unit of the reproducing apparatus 1102 along the upper/lower/right/left directions;

a position of a pointing cursol within the area 405; and a total pixel number indicative of 1 move unit of the pointing cursor.

When a direction button 801 is depressed in the terminal 106 whose operation mode is set to "scroll operation", the moving picture reproducing apparatus 107 produces a direction signal which implies a designation direction, and then sends this direction signal via the network interfaces 115*a*/115*b* and the communication path 111 to the relay control unit 1201 employed in the service relaying apparatus 1101. The terminal 106 produces this direction signal and sends the produced direction signal to the service relaying apparatus 1101 every time the direction button 801 is depressed.

Figure 13:
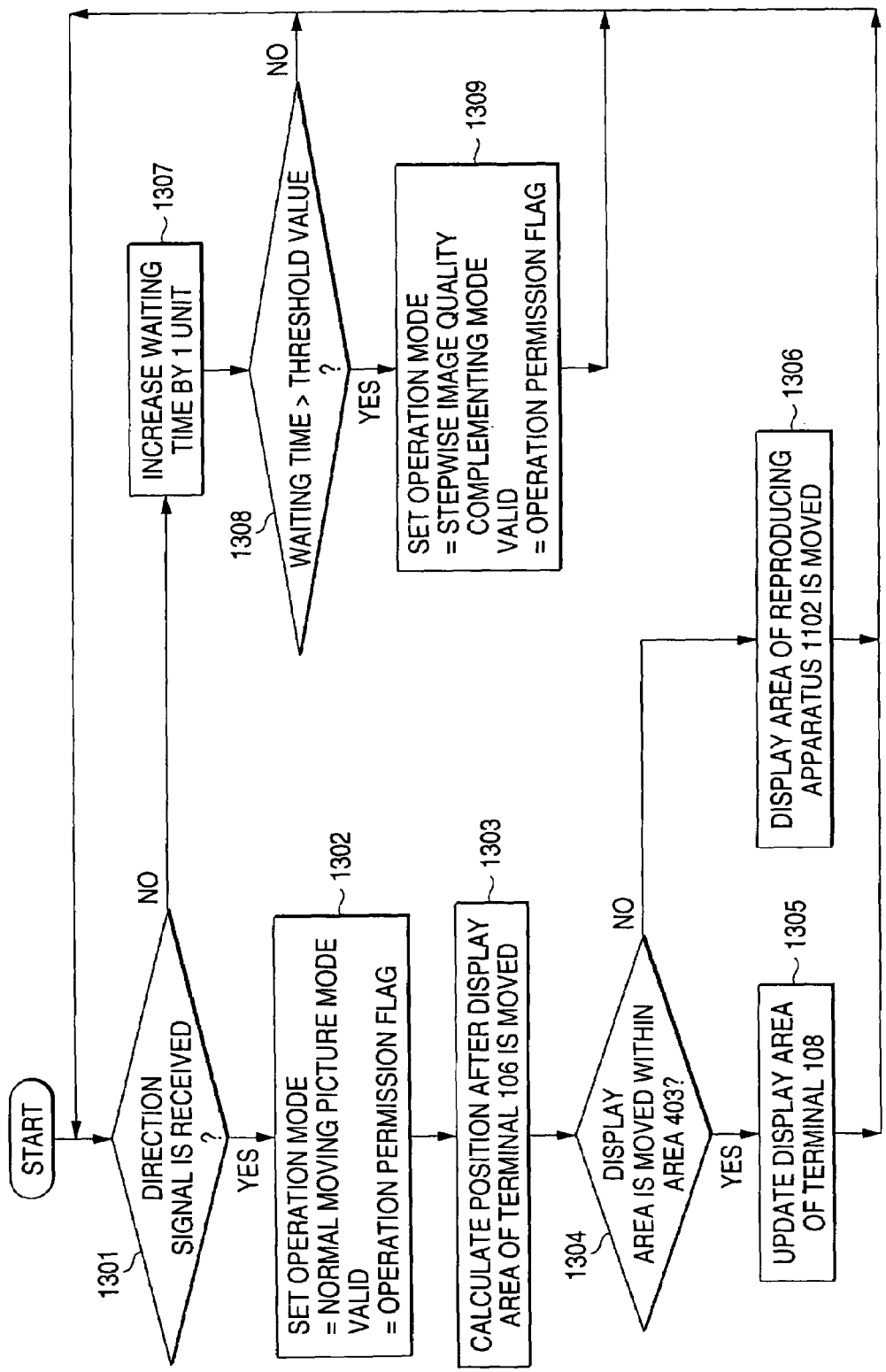
FIG. 13 is a flow chart for describing operation of a relay control unit when a direction signal is received in the second embodiment mode of the present invention.

Upon receipt of this direction signal, the relay control unit 1201 executes a process operation as indicated in FIG. 13. As a result, the moving picture coding apparatus 1103 converts a designated area of the contents data 110 into compressed moving picture data, and sends this compressed moving picture data to the terminal 106.

Referring now to FIG. 13, operations of the relay control unit 1201 will be explained.

Upon receipt of the direction signal sent from the terminal 106 (step 1301), the relay control unit 1201 sets the operation mode stored in the operation control information memory 304 to the normal moving picture mode, and valids the operation permission flag (step 1302), and also calculates such a position (Xt, Yt) that the area 405 is moved by 1 move unit along the designated direction (step 1303).

When a new position of the area 405 is located in the area 403 (step 1304), the relay control unit 1201 rewrites a position of an area which is actually coded in the still picture data by the position calculated at the step 1303 (step 1305), and then waits to receive a new direction signal (step 1301).

In such a case that the new position of the area 405 exceeds the area 403 (step 1304), the relay control unit 1201 sends the control signal 1104 to the reproducing apparatus 1102 so as to move the position of the area 403 by 1 move unit along the designated direction (step 1306), and then waits to receive a new direction signal (step 1301).

When the direction signal is not received (step 1301), the relay control unit 1201 increases the reception waiting time of the direction signal by 1 unit time (step 1307). When this reception waiting time exceeds a preselected threshold value (step 1308), the relay control unit 1201 sets the operation mode stored in the operation control information memory 304 to the stepwise image quality complementing mode, and valids the operation permission flag (step 1309), and waits to receive a new direction signal (step 1301). With execution of this process operation, the moving picture coding apparatus 104, according to this embodiment mode, automatically sends the contents data 110 having the high image quality to the terminal 106 when the reception waiting time of the direction signal exceeds predetermined time, and then stops the process operation.

A description will now be made of operations and realizing means, according to this embodiment mode, which changes displaying of the contents data 110 based on link information (URL) stored in the contents data 110.

The terminal 106 designates link information contained in the contents data 110 by using a pointing cursor in order to change the display of this contents data 110. The pointing cursor provides a similar function to that of a mouse cursol used in a personal computer. This pointing cursor is displayed on the display unit of the terminal 106 with the contents data 110 at the same time. The terminal 106 itself displays the pointing cursor on the display unit, and also moves the pointing cursor in response to the depressing operation of the direction button 801.

When the direction button 801 is depressed under such a condition that the pointing cursor is displayed on the terminal 106, the pointing cursor is moved by a preselected move unit along a designated direction, and the terminal 106 transfers both the move direction and the move amount of this pointing cursor via the network interfaces 115a/115b and the communication path 111 to the relay control unit 1201.

Figure 14:
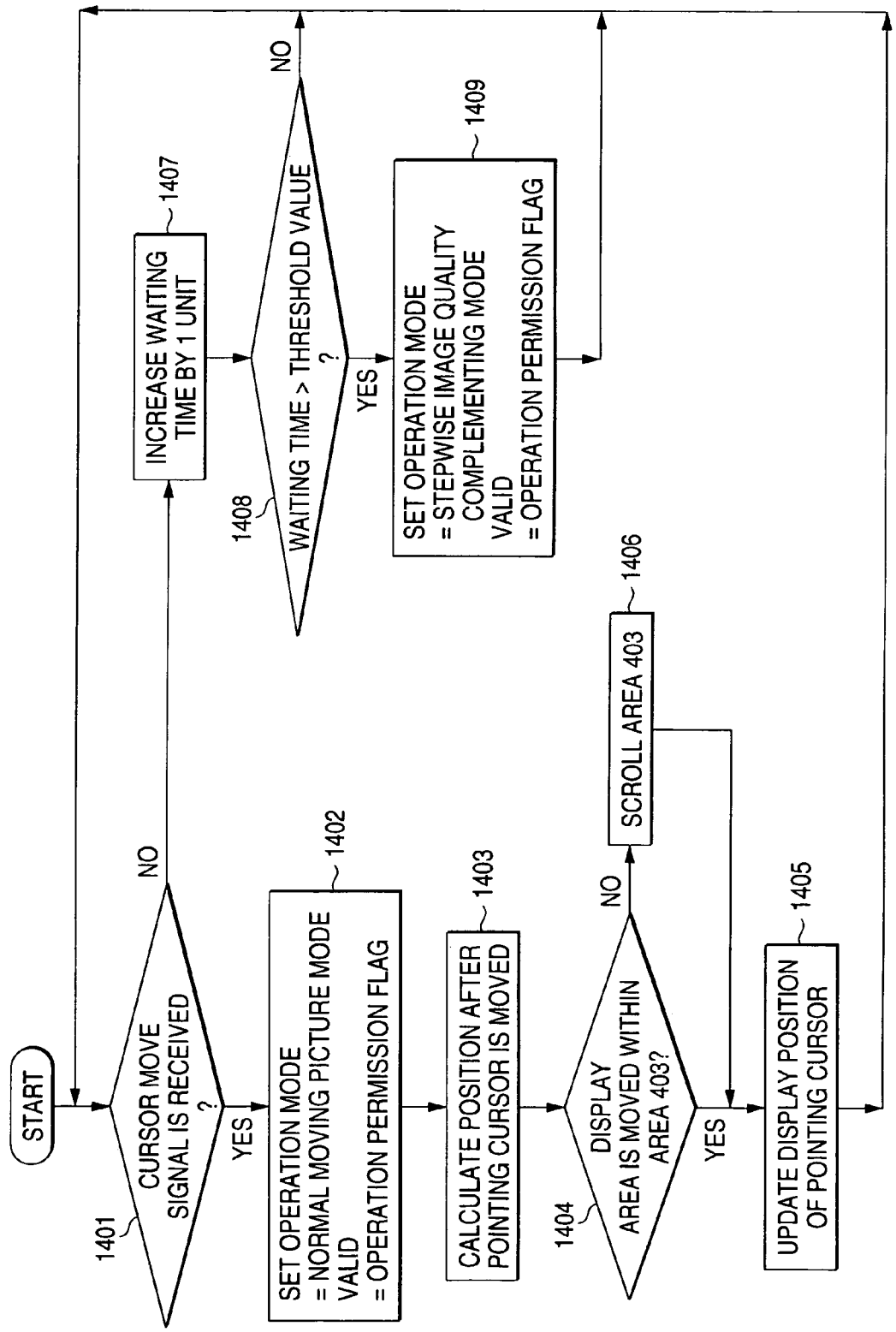
FIG. 14 is a flow chart for describing operation of the relay control unit when a pointing cursor is moved in the second embodiment mode of the present invention.

FIG. 14 shows an operation flow for describing the relay control unit 1201 related to the movement of the pointing cursor.

Upon receipt of the signal related to the pointing cursor movement sent from the terminal 106 (step 1401), the relay control unit 1201 sets the operation mode stored in the operation control information memory 304 to the normal moving picture mode, and valids the operation permission flag (step 1402), and also calculates such a new position of the pointing cursor based upon such information saved in the own relay control unit 1201 (step 1403). In other words, this information is related to the position of the area 403, the position of the area 405, the position of this pointing cursor within the area 405, a total pixel number indicative of one move unit of this pointing cursor, and the information related to the pointing cursor movement sent from the terminal 106 (namely, both move direction and move amount of pointing cursor).

The position of this pointing cursor within the area 401 may be calculated by adding xd0+xt0, and yd0+yt0 to the position of the pointing cursor within the area 405 along an X-axis direction and a Y-axis direction, respectively.

When the new position of this pointing cursor is located within the area 403 (step 1404), the relay control unit 1201 sends the control signal 1104 to the reproducing apparatus 1102 so as to update the position of the pointing cursor on the reproducing apparatus 1102 (step 1405).

When the new position of the pointing cursor is not located within the area 403 (step 1404), the relay control unit 1201 moves the contents data 110 along the move direction of the pointing cursor (step 1406), and thereafter, executes the process operation defined at the step 1405.

When the move signal is not received (step 1401), the relay control unit 1201 increases the reception waiting time of the move signal by 1 unit time (step 1407). When this reception waiting time exceeds a preselected threshold value (step 1408), the relay control unit 1201 sets the operation mode stored in the operation control information memory 304 to the stepwise image quality complementing mode, and valids the operation permission flag (step 1409), and waits to receive a new move signal (step 1401). With execution of this process operation, the moving picture coding apparatus 104, according to this embodiment mode, automatically sends the contents data 110 having the high image quality to the terminal 106 when the reception waiting time of the move signal exceeds predetermined time, and then stops the process operation.

After the pointing cursor is moved to a position of desirable link information in the terminal 106, when the start button 803 is depressed which implies such a fact that the selection of this link information is defined, the terminal 106 transfers the definition of the link information selection via the network interfaces 115a/115b and the communication path 111 to the relay control unit 1201.

Figure 15:
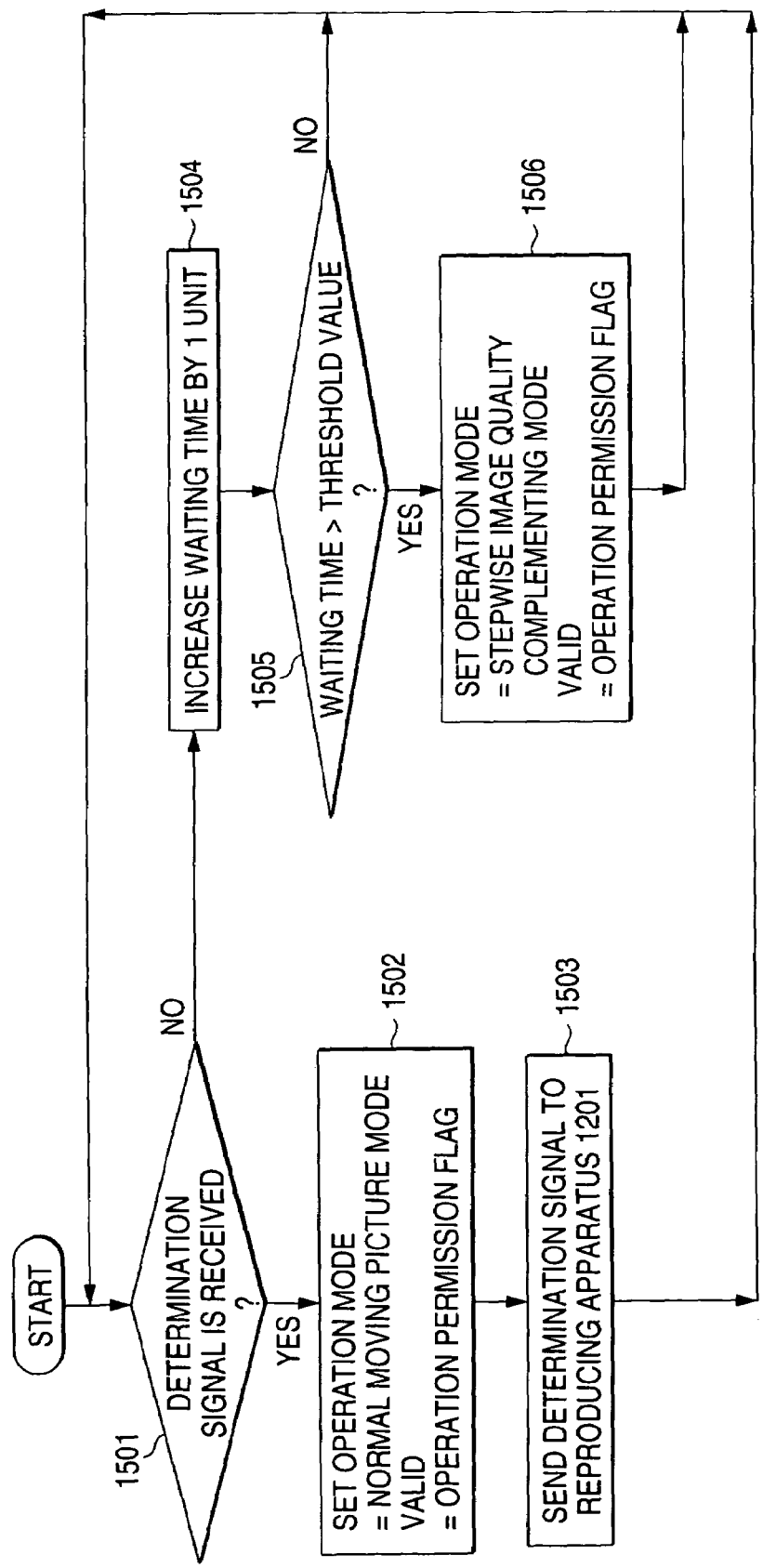
FIG. 15 is a flow chart for describing operation of the relay control unit when link information is selected and defined in the second embodiment mode of the present invention.

FIG. 15 is an operation flow for explaining a definition of selected link information by the relay control unit 1201.

Upon receipt of such a signal implying that a selection of link information is defined (step 1501), the relay control unit 1201 sets the operation mode stored in the operation control information memory 304 to the normal moving picture mode, and also valids the operation permission flag (step 1502). When a left button of the mouse is depressed, the relay control unit 1201 sends a similar signal by way of the control signal 1104 to the reproducing apparatus 1201 (step 1503). As a result, the new contents data 110 related to the link information is displayed by the reproducing apparatus 1201 on the image data relaying apparatus 103, so that this new contents data 110 may be newly displayed on the terminal 106.

When the definition signal is not received (step 1501), the relay control unit 1201 increases the reception waiting time of the definition signal by 1 unit time (step 1504). When this reception waiting time exceeds a preselected threshold value (step 1505), the relay control unit 1201 sets the operation mode stored in the operation control information memory 304 to the stepwise image quality complementing mode, and valids the operation permission flag (step 1506), and waits to receive a new definition signal (step 1501). With execution of this process operation, the moving picture coding apparatus 104, according to this embodiment mode, automatically sends the contents data 110 having the high image quality to the terminal 106 when the reception waiting time of the direction signal exceeds predetermined time, and then stops the process operation.

Next, a description will now be made of a change in display conditions of the reproducing apparatus 1102 in response to the control signal 1104, for example, a displayed content is moved along the upper/lower/right/left directions, and also link information is selected by the pointing cursor and a displayed content thereof is changed by the pointing cursor.

In this embodiment mode, it is now assumed that both the reproducing apparatus 1102 and the control apparatus 1103 are operated under the same operating system (OS), and constitute an execution unit of a program called as a "process", respectively.

As previously explained, in response to the button operation made from the terminal 106, the relay control unit 1201 employed in the control apparatus 1103 produces the control signal 1104 and then sends this control signal 1104 to the reproducing apparatus 1102. This control signal 1104 instructs the reproducing apparatus 1102 to change the display condition thereof. At this time, the control signal 1104 owns the same content as that of an event signal which is produced by depressing a keyboard and by manipulating a mouse in the reproducing apparatus 1102. The relay control unit 1201 transmits this control signal 1104 to the reproducing apparatus 1102 by utilizing an inter process communication function provided by the operating system.

In the case that the contents reproducing software used in the reproducing apparatus 1102 is solely operated independent from this embodiment mode, an event signal which is produced by depressing the keyboard, or by manipulating the mouse, is transmitted to the contents reproducing software by utilizing either the process provided by the operating system or the communication function.

Also, in this embodiment mode, since the control signal 1104 is transmitted to the contents reproducing software saved in the reproducing apparatus 1102 by using a similar inter process communication function, the reproducing apparatus 1102 may interpret this control signal 1104 derived from the relay control unit 1201 in such a way that this control signal 1104 is produced by actually depressing the keyboard, or actually manipulating the mouse. The control apparatus 1103 can change the display condition of the reproducing apparatus 1102 by employing such a means.

It should also be noted that the format of the compressed moving picture data usable in this second embodiment mode is identical to the format of the compressed moving picture data usable in the first embodiment mode.

Similar to the first embodiment mode, in the picture data relaying apparatus 103 according to this embodiment mode, the video memory may be replaced by a semiconductor memory such as a DRAM, or a storage apparatus such as a magnetic disk apparatus.

As previously described, in accordance with this embodiment mode, since the contents data 110 saved in the service providing apparatus 109, namely the home page described in the HTML, is converted into the compressed moving picture data by the service relaying apparatus 1101, this contents data 110 can be displayed by such a terminal 106 having no function capable of displaying this data (HTML).

Also, with respect to the contents data 110 under display, the terminal 106 can perform the following operations, namely, the entire area of this contents data 110 is displayed and an arbitrary data portion thereof is displayed in an enlarge manner; the contents data 110 is moved along the upper/lower/right/left directions (scroll display); and the displayed content of the contents data 110 is changed by using the link information (URL) contained in this contents data 110. As a consequence, there is a great practical merit.

Embodiment 3

A third embodiment mode of the present invention will now be described with reference to FIG. 16 to FIG. 20.

Figure 16:
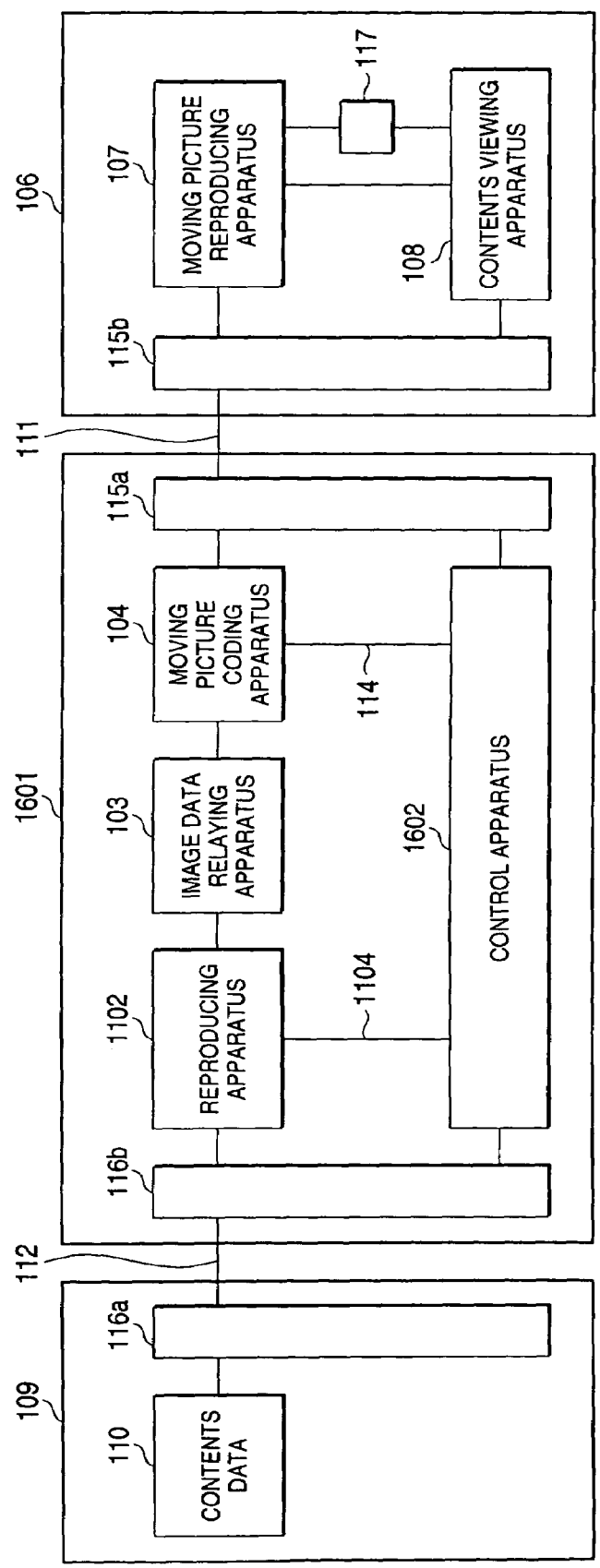
FIG. 16 is a structural diagram for showing a third embodiment mode of the present invention.

FIG. 16 represents a structural diagram of the third embodiment mode. In FIG. 16, reference numeral 1601 shows a service relaying apparatus; and reference numeral 1602 is a control apparatus. Other structural elements of the third embodiment mode are identical to those of the second embodiment mode. A major different point between the arrangement of the third embodiment mode and the arrangement of the second embodiment mode is the control apparatus 1602 in the service relaying apparatus 1601.

First, a description will now be made of usable modes directed to this embodiment mode.

Although the terminal 106 is identical to the terminal 106 employed in the second embodiment mode, the contents data 110 displayed on this terminal 106 is different from each other. The contents data 110 expected in the third embodiment mode is a home page described by the HTML (Hyper Text Markup Language), and is constituted by an animation using computer graphics in addition to both character data and still picture data.

When such a contents data 110 is displayed on the terminal 106, the entire area of the contents data 110 is first compressed and then, the compressed contents data is displayed. As apparent from the foregoing description, the entire image of the contents data displayed on the terminal 106 owns low visibility as to very small areas thereof. As a result, an arbitrary partial portion of the contents data 110 is enlarged by arbitrarily setting magnification by manipulating the operation button 117 equipped on the terminal 106 so as to display a detailed portion of this contents data 110. In addition, a home page under display is moved along upper/lower/right/left directions, and also other home pages related to the first-mentioned home page by an URL (Universal Resource Locator) are selected/displayed by the operation button 117.

Next, a description will be made of both operations of this embodiment mode and realizing means thereof.

Figure 17:
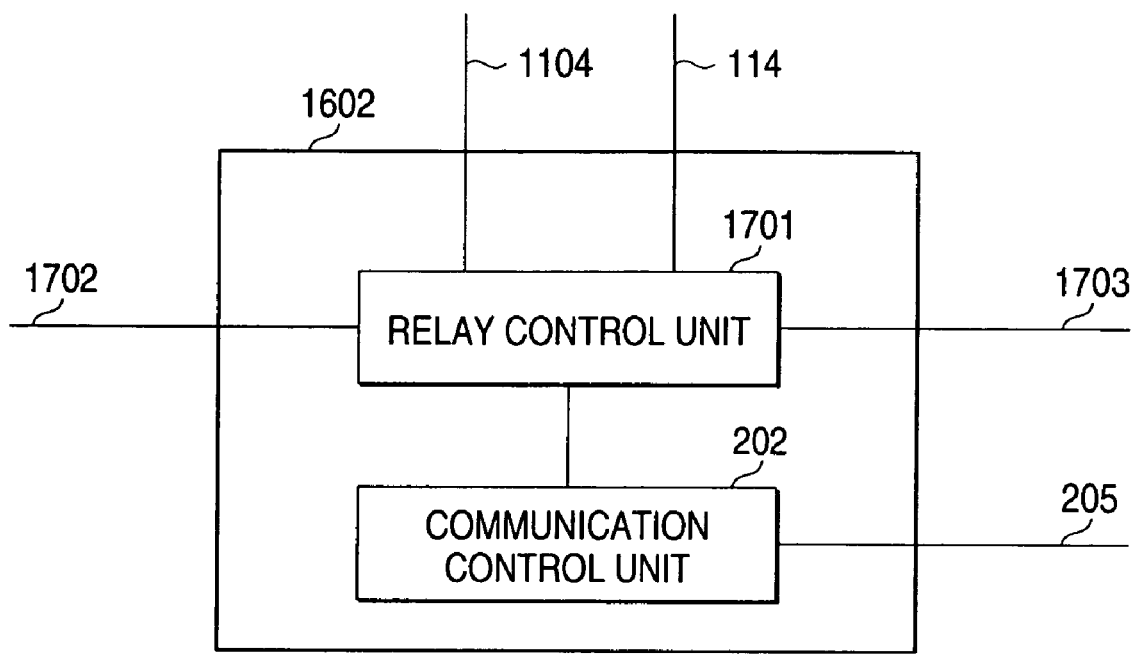
FIG. 17 is a structural diagram for indicating a control apparatus in the third embodiment mode of the present invention.

Operations of the control apparatus 1602 will now be explained. FIG. 17 shows an arrangement of the control apparatus 1602. In FIG. 17, reference numeral 1701 indicates a relay control unit, reference numeral 1702 indicates a communication path between this control apparatus 1602 and the network interface 116b, and reference numeral 1703 shows a communication path between this control apparatus 1602 and the network interface 115b. Other structural elements are identical to those of the control apparatus 1103 in the second embodiment mode.

The communication control unit 202 performs a basic control operation for communication between the terminal 106 and the service relaying apparatus 1601 similar to the second embodiment mode. After the communication between the terminal 106 and the service relaying apparatus 1601 is established by the communication control unit 202, a major function of the control apparatus 1602 is provided by the relay control unit 1701. Similar to the above-explained second embodiment mode, the relay control unit 1701 selects data to be sent to the terminal 106, namely selects either character data or compressed moving picture data.

Now, a description will be made of a process operation for converting the contents data 110 into the compressed moving picture data and for transmitting the compressed moving picture data to the terminal 106. In this case, only different process operation of this third embodiment mode from the second embodiment mode will now be explained.

A different point between this third embodiment mode and the second embodiment mode is such that the contents data of this third embodiment mode owns motion. In other words, the contents data 110 employed in the second embodiment mode corresponds to the home page constituted by the character data and the still picture data, whereas the contents data 110 employed in this third embodiment mode corresponds to such a home page described by the HTML, but also containing an animation with use of computer graphics.

Now, a description will be made of operations of the respective structural elements and realizing means in the case that with respect to such a contents data 110, similar to the various operations of the second embodiment mode, the following operations are carried out. That is to say, the entire area of the contents data 110 is displayed and an arbitrary data portion thereof are displayed in an enlarge manner; the contents data 110 is moved along the upper/lower/right/left directions (scroll display); and the display content of the contents data 110 is changed based upon the link information (URL) contained in the content data 110.

Both a displaying method for displaying the entire area of the contents data 110 and an enlarging display method for displaying an arbitrary data portion thereof are similar to the method for displaying a portion of the contents data 110 in the enlarge manner, as described in the first embodiment mode. A different point is given as follows. That is, the moving picture coding apparatus 104 is continuously operated in the normal moving picture mode. As previously explained, since the contents data 110 expected in this third embodiment mode owns motion, this moving picture coding apparatus 104 must be continuously operated in the normal moving picture mode. As a consequence, the relay control unit 1701 continuously sets the operation mode saved in the operation control information memory 304 to the normal moving picture mode, so that the moving picture coding apparatus 104 is always operated in the normal moving picture mode. As a consequence, the entire area of the contents data 110 having motion and the arbitrarily selected partial data of this contents data 110 can be displayed.

A description will now be made of operations and realizing means, according to this embodiment mode, for moving the contents data 110 along the upper/lower/right/left directions, and also for changing the display content of the contents data 110 based upon the link information (URL) contained in the contents data 110.

Similar to the second embodiment mode, the relay control unit 1701 saves such information related to the contents data 110 which has been stored in the operation control information memory 304 in an internal storage unit (not shown in detail) thereof. In other words, this relay control unit 1701 saves;

a position (xd0, yd0) and a dimension (Xd, Yd) of the codable bit map data 403 stored in the picture data relaying apparatus 103, and a position (xt0, yt0) and a dimension (Xt, Yt) of the area 405 which is actually coded within the bit map data 403; and in addition, a total pixel number indicative of 1 move unit of the reproducing apparatus 1102 along the upper/lower/right/left directions;

a position of a pointing cursol within the area 405; and a total pixel number indicative of 1 move unit of the pointing cursol. It should be noted that major operations of the terminal 106 and the relay control unit 1701 are identical to those of the second embodiment mode, only different points will be described.

Figure 18:
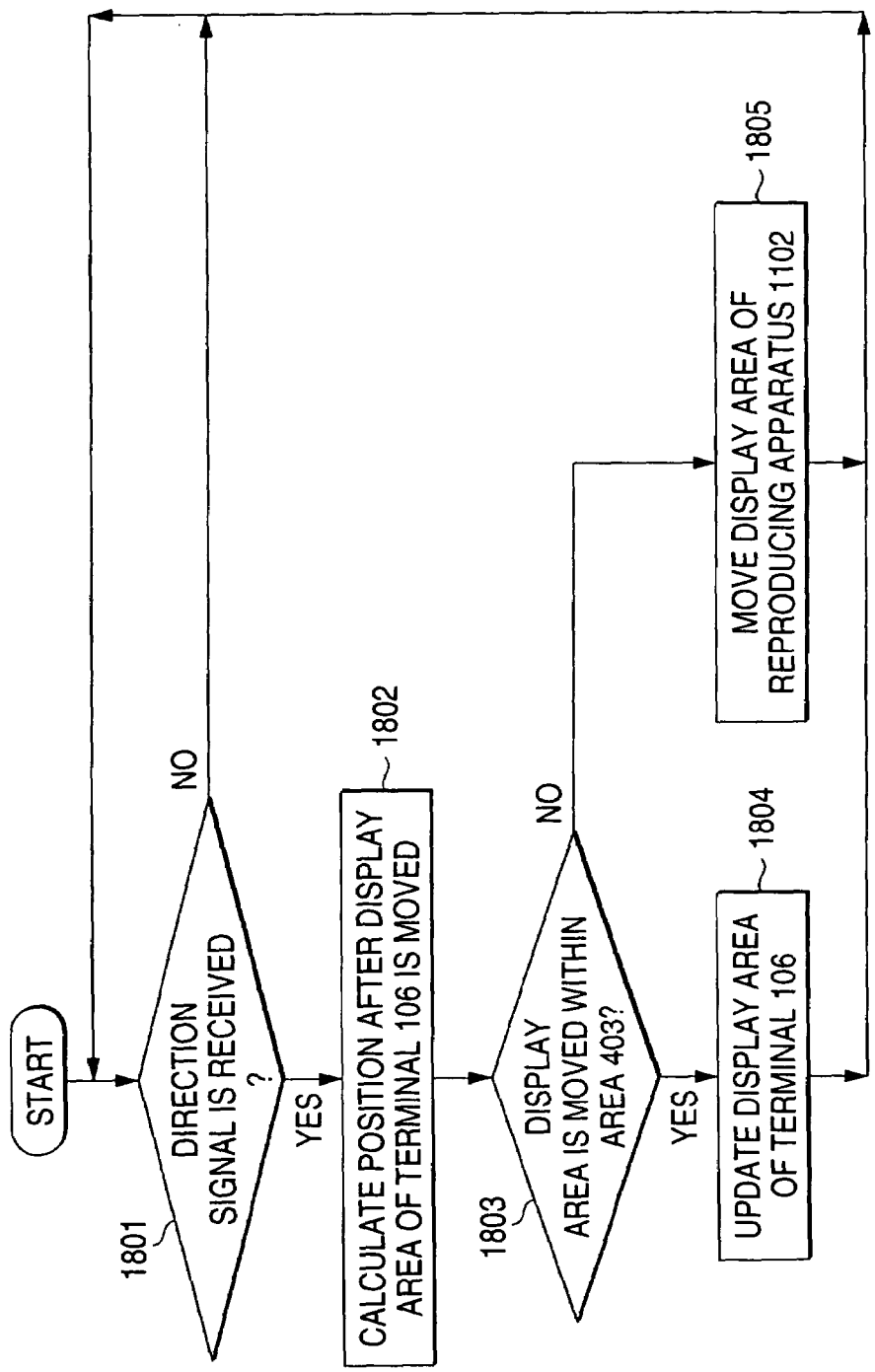
FIG. 18 is a flow chart for describing operation of a relay control unit when contents data is moved along upper-lower-right-left directions in the third embodiment mode of the present invention.
Figure 19:
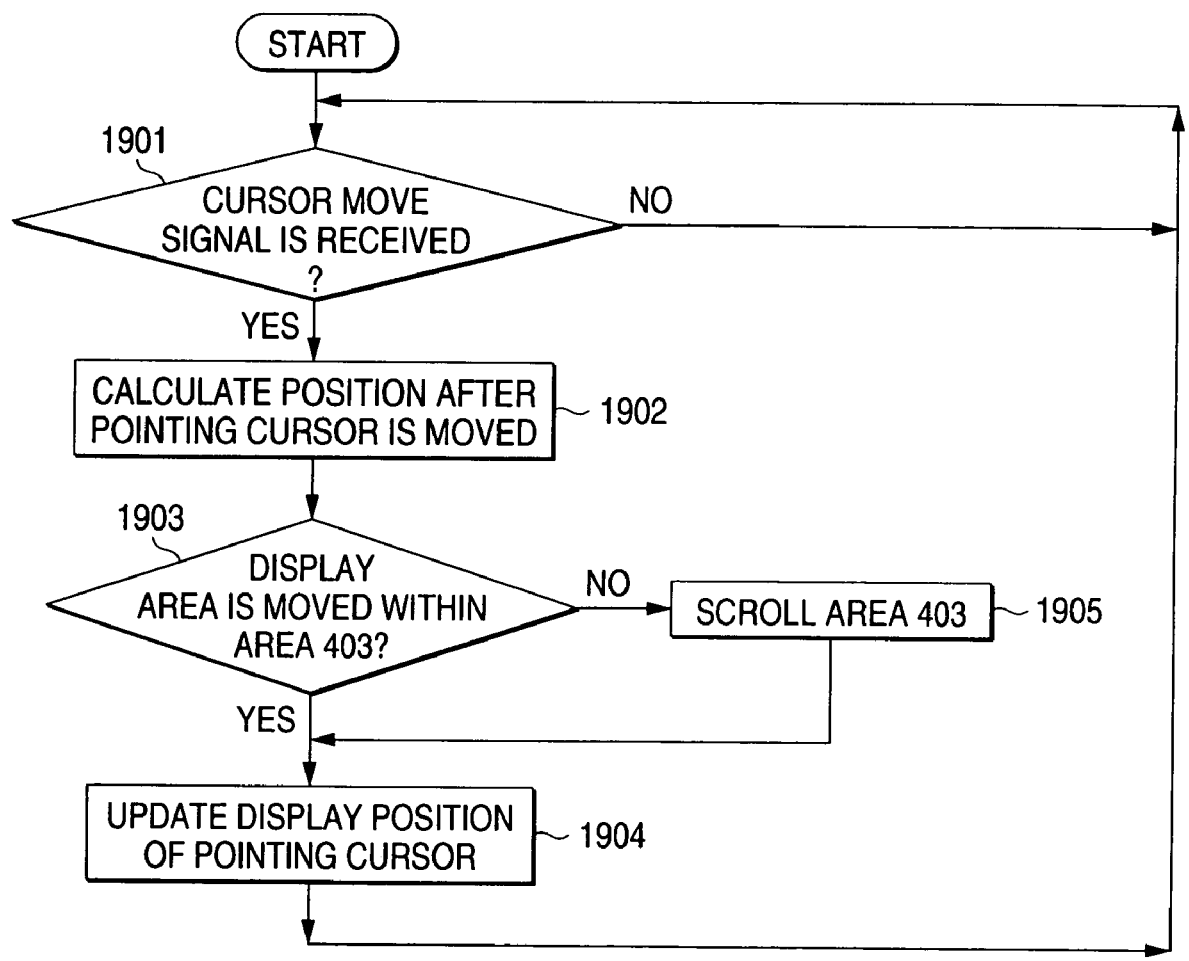
FIG. 19 is a flow chart for describing operation of the relay control unit when a pointing cursor is moved in the third embodiment mode of the present invention.
Figure 20:
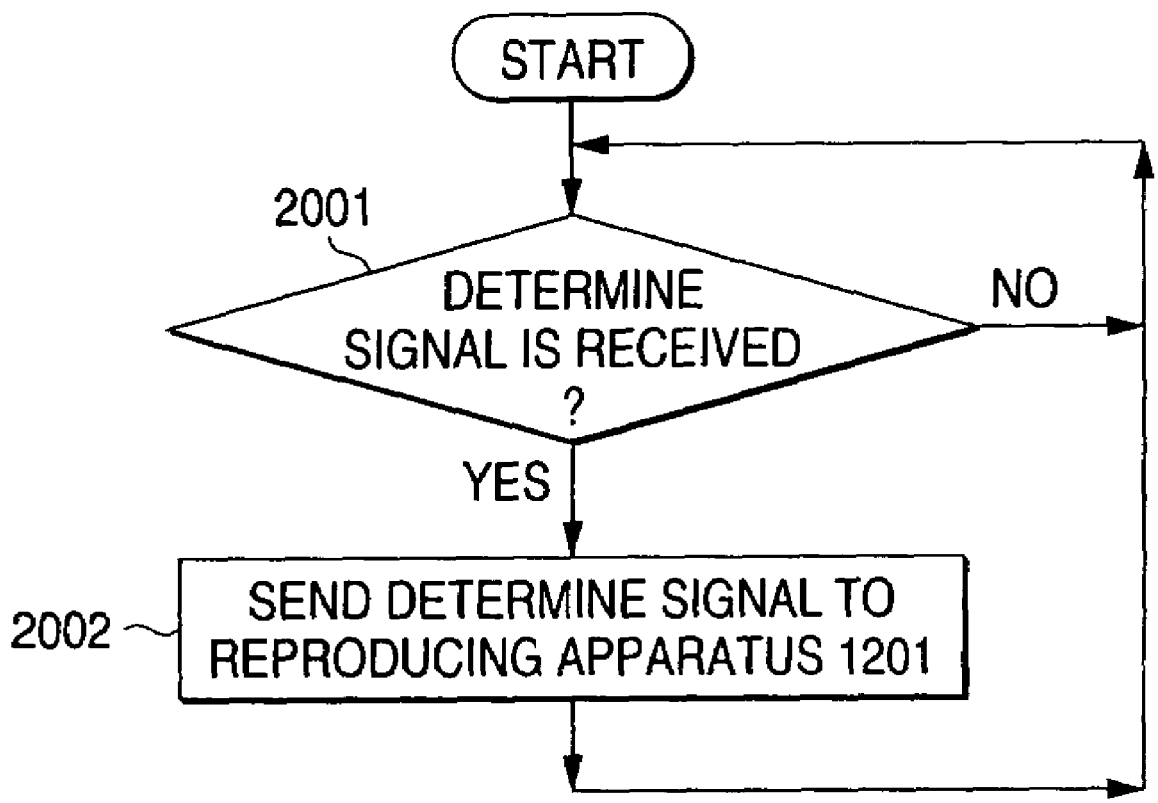
FIG. 20 is a flow chart for describing operation of the relay control unit when link information is selected and defined in the third embodiment mode of the present invention.

The operation mode of the moving picture coding apparatus 104 in this embodiment mode is continuously set to the normal moving picture mode. As a result, an operation flow of the relay control unit 1701 for explaining that the contents data 110 is moved along the upper/lower/right/left directions is represented in FIG. 18. Also, operation flows of the relay control unit 1701 for describing that the pointing cursor is moved, and the link information is selected/defined are indicated in FIG. 19 and FIG. 20.

The respective steps defined in the flow operation of FIG. 18 may correspond to those defined in the flow operation of FIG. 13 as follows:

A process operation defined at a step 1801 is identical to that defined at a step 1301;

A process operation defined at a step 1802 is identical to that defined at a step 1303;

A process operation defined at a step 1803 is identical to that defined at a step 1304;

A process operation defined at a step 1804 is identical to that defined at a step 1305; and A process operation defined at a step 1805 is identical to that defined at a step 1306.

The respective steps defined in the flow operation of FIG. 19 may correspond to those defined in the flow operation of FIG. 14 as follows:

A process operation defined at a step 1901 is identical to that defined at a step 1401;

A process operation defined at a step 1902 is identical to that defined at a step 1403;

A process operation defined at a step 1903 is identical to that defined at a step 1404;

A process operation defined at a step 1904 is identical to that defined at a step 1405; and A process operation defined at a step 1905 is identical to that defined at a step 1406.

The respective steps defined in the flow operation of FIG. 20 may correspond to those defined in the flow operation of FIG. 15 follows:

A process operation defined at a step 2001 is identical to that defined at a step 1501; and A process operation defined at a step 2002 is identical to that defined at a step 1503.

In other words, the relay control unit 1701 employed in this embodiment mode causes the moving picture coding apparatus 104 to be continuously operated in the normal moving picture mode.

It should also be noted that the format of the compressed moving picture data usable in this third embodiment mode is identical to the format of the compressed moving picture data usable in the first embodiment mode.

Similar to the first embodiment mode, in the picture data relaying apparatus 103 according to this embodiment mode, the video memory may be replaced by a semiconductor memory such as a DRAM, or a storage apparatus such as a magnetic disk apparatus.

As previously described, in accordance with this embodiment mode, since the contents data 110 saved in the service providing apparatus 109, namely the home page having motion data (animation made of computer graphics) described in the HTML, is converted into the compressed moving picture data by the service relaying apparatus 1101, this contents data 110 can be displayed by such a terminal 106 having no function capable of displaying this data (HTML).

Also, with respect to the contents data 110 under display, the terminal 106 can perform the following operations, namely, the entire area of this contents data 110 is displayed and an arbitrary data portion thereof is displayed in an enlarge manner; the contents data 110 is moved along the upper/lower/right/left directions (scroll display); and the displayed content of the contents data 110 is changed by using the link information (URL) contained in this contents data 110. As a consequence, there is a great practical merit.

Embodiment Mode 4

A fourth embodiment mode of the present invention will now be described with reference to FIG. 21 to FIG. 22.

Figure 21:
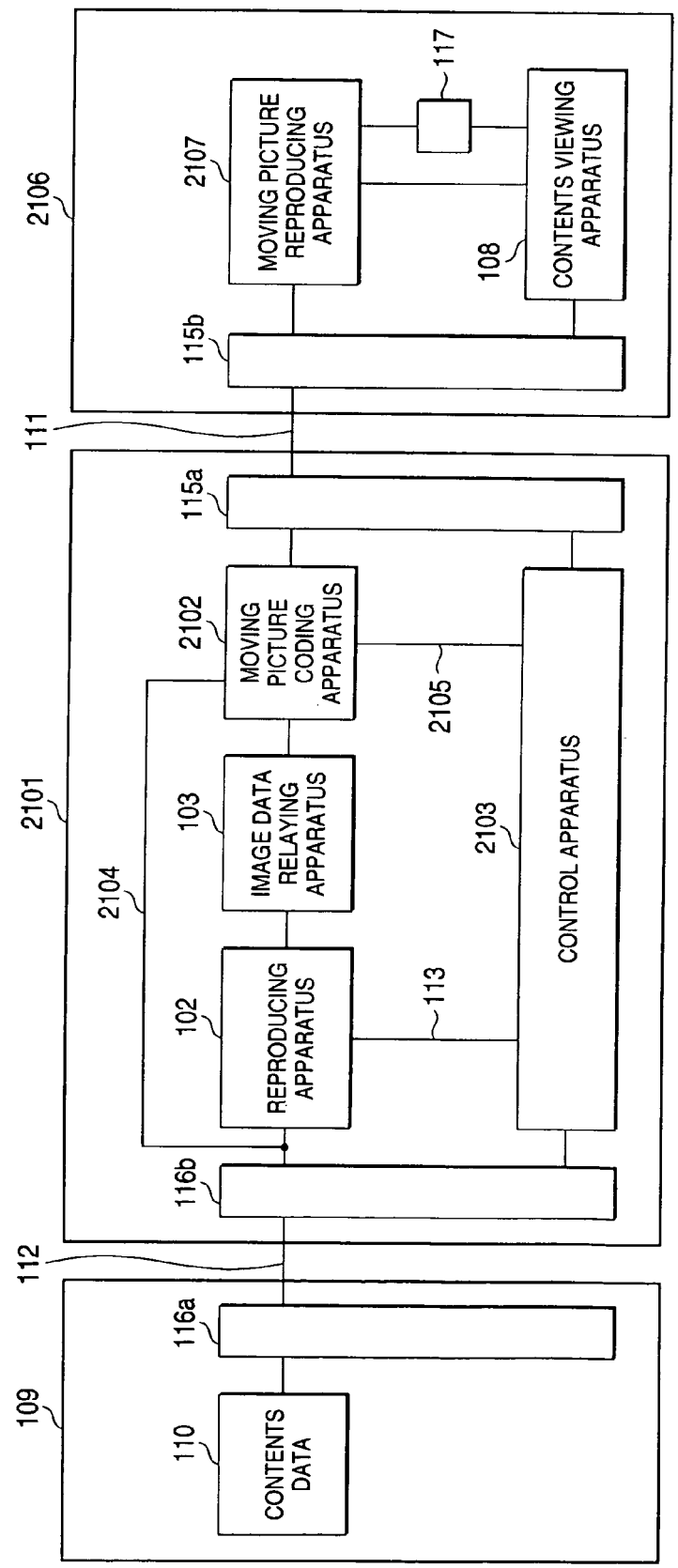
FIG. 21 is a structural diagram for showing a fourth embodiment mode of the present invention.

FIG. 21 represents a structural diagram of the fourth embodiment mode. In FIG. 21, reference numeral 2101 shows a service relaying apparatus; reference numeral 2102 shows a moving picture coding apparatus; and reference numeral 2103 is a control apparatus. Also, reference numeral 2104 shows audio data contained in the contents data 110; reference numeral 2105 denotes a control signal of the moving picture coding apparatus 2103; reference numeral 2106 shows a multimedia communication terminal; and furthermore reference numeral 2107 shows a moving picture reproducing apparatus. Other structural elements of the fourth embodiment mode are identical to those of the first embodiment mode. A major different point between the arrangement of the fourth embodiment mode and the arrangement of the first embodiment mode is both the moving picture coding apparatus 2102 and the control apparatus 2103 in the service relaying apparatus 2101, and also the moving picture reproducing apparatus 2107 in the multimedia communication terminal 2106 (will be referred to as a "terminal" hereinafter).

First, a description will now be made of usable modes directed to this embodiment mode.

Similar to the first embodiment mode, both the contents data 110 and digital still picture data which are stored in the service providing apparatus 109 are displayed on the terminal 2106. At this time, the contents data 110 owns the audio data in addition to the still picture data. As a consequence, the still picture is displayed and at the same time, the audio data is reproduced at the terminal 2106.

Next, operations of this embodiment mode and realizing means thereof will now be explained.

The moving picture reproducing apparatus 2107 employed in the terminal 2106 owns such a function capable of decoding/displaying compressed moving image data similar to the moving picture reproducing apparatus 107 according to the first embodiment mode, and furthermore, another function capable of decoding/reproducing audio data which is transmitted at the same time as the compressed moving picture data.

Figure 22:
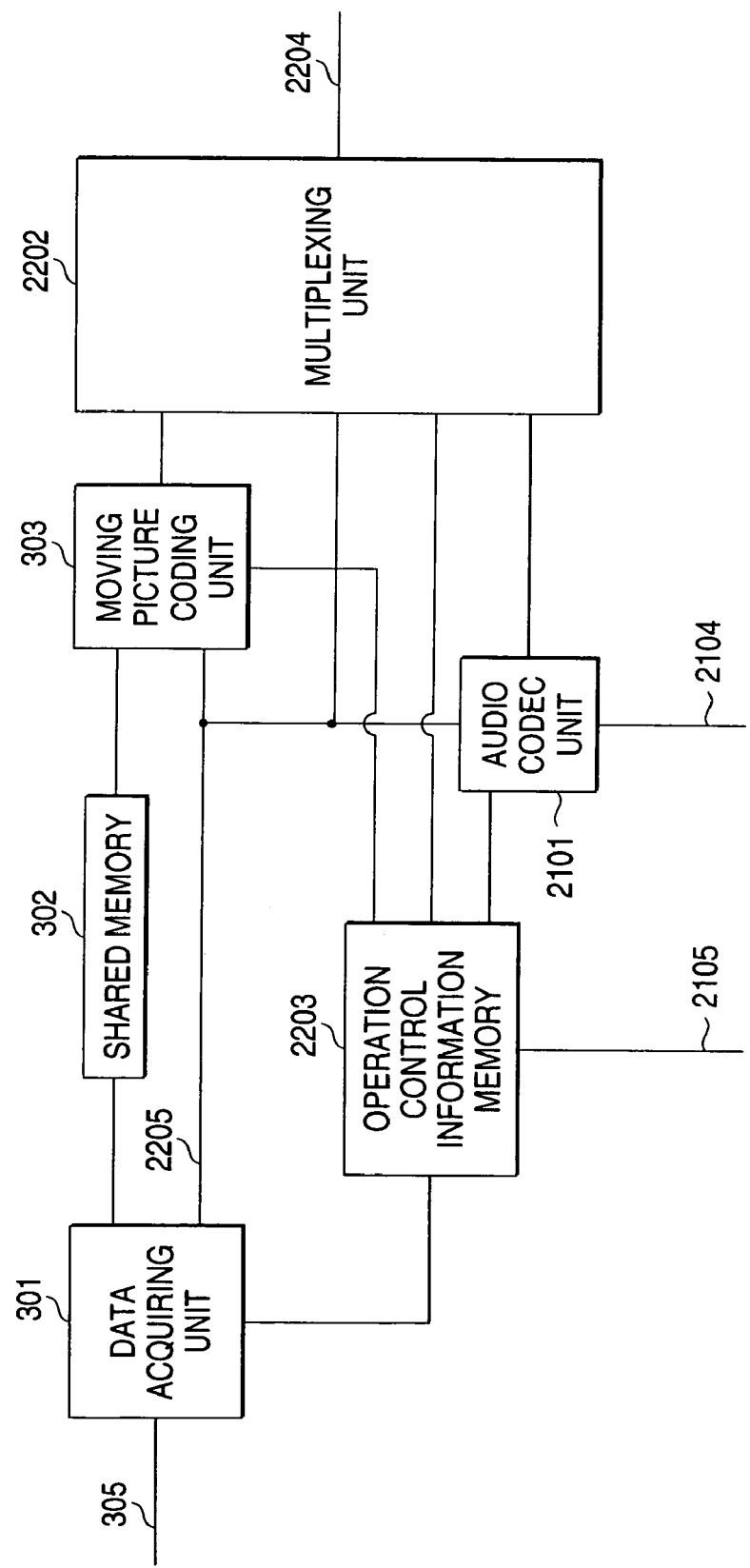
FIG. 22 is a structural diagram for indicating a moving picture coding apparatus in the fourth embodiment mode of the present invention.

FIG. 22 shows a structural diagram of the moving picture coding apparatus 2102.

In FIG. 22, reference numeral 2201 indicates an audio codec unit; reference numeral 2202 represents a multiplexing unit; reference numeral 2203 shows an operation control information memory; reference numeral 2204 represents multiplexed AV data; and reference numeral 2205 is a control signal. Other structural elements of this fourth embodiment are identical to those of the moving picture coding apparatus 104 in the first embodiment mode.

The information used to define the operations of the moving picture coding apparatus 2102 is stored into the operation control information memory 2203 via the control signal 2105. In this embodiment mode, the information stored in the operation control information memory 2203 is given as follows in addition to the information stored in the operation control information memory 304 in the first embodiment mode:

That is to say, a storage position and a data amount of the audio data 2104;

a coding format and a bit rate of the audio data 2104;

a coding format and a bit rate of audio data outputted by the audio codec unit 2201; and a bit rate of the multiplexed AV data 2204 outputted by the multiplexing unit 2202.

Next, a description will now be made of operations of the moving picture coding apparatus 2102.

Since a producing operation of compressed moving picture data by the moving picture coding apparatus 2102 is identical to that of the first embodiment mode, only a different producing operation from that of the moving picture coding apparatus 104 according to the first embodiment mode will now be described.

Upon receipt of a control signal 2205 from the data acquiring unit 301, an audio codec unit 2201 derives such information required to produce audio data from the operation control information memory 2204. This control signal 2205 implies that the operation is commenced. Also, the audio codec unit 2201 derives designated audio data from the service providing apparatus 109 via the communication path 112 and the network interfaces 116a/116b, and then converts this derived audio data into desirable audio data.

When the multiplexing unit 2202 receives such a control signal which implies the commencement of the operation from the data acquiring unit 301, the multiplexing unit 2202 derives information required to execute the multiplexing process operation from the operation control information memory 2204. Then, the multiplexing unit 2202 multiplexes the compressed moving picture data supplied from the moving picture coding unit 303 with the audio data supplied from the audio codec unit 2201 so as to produce the multiplexed AV data 2204, and then transfers this multiplexed AV data 2204 to the terminal 2106.

As previously explained, the control apparatus 2103 performs a control process operation via a control signal 2105 in such a manner that the moving picture coding apparatus 2102 is operated. Similar to the control apparatus 105 employed in the first embodiment mode, this control apparatus 2103 executes a basic communication control operation between the service relaying apparatus 2101 and the terminal 2106.

It should also be noted that the format of the compressed moving picture data usable in this second embodiment mode is identical to the format of the compressed moving picture data usable in the first embodiment mode.

Similar to the first embodiment mode, in the picture data relaying apparatus 103 according to this embodiment mode, the video memory may be replaced by a semiconductor memory such as a DRAM, or a storage apparatus such as a magnetic disk apparatus.

As previously described, in accordance with this fourth embodiment mode, since the contents data 110 saved in the service providing apparatus 109, namely the still picture data having the audio data, is converted into the multiplexed AV data by the service relaying apparatus 2101, this contents data 110 can be displayed by such a terminal 106 having no function capable of displaying this multiplexed AV data. As a consequence, there is a great practical merit.

Embodiment 5

A fifth embodiment mode of the present invention will now be described with reference to FIG. 23.

Figure 23:
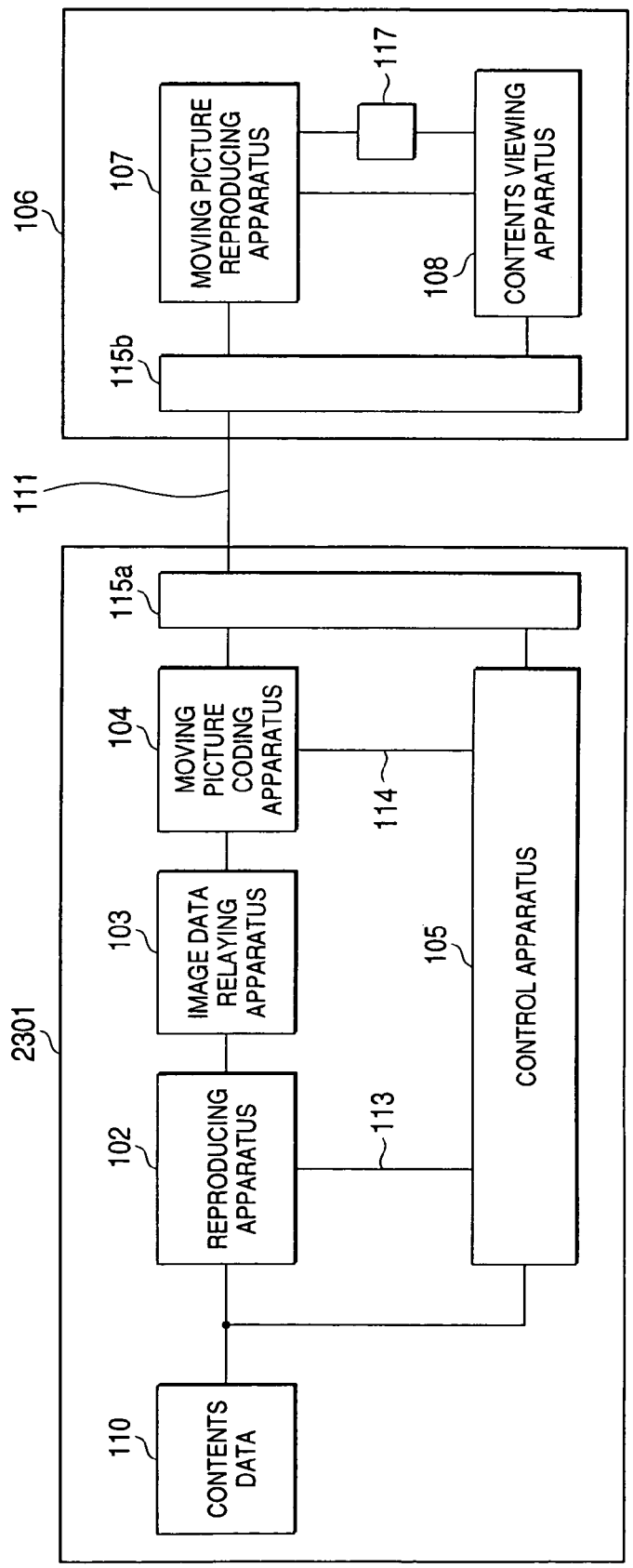
FIG. 23 is a structural diagram for indicating a fifth embodiment mode of the present invention.

FIG. 23 represents a structural diagram of the fifth embodiment mode. In FIG. 23, reference numeral 2301 shows a service providing apparatus. Other structural elements of the fifth embodiment mode are identical to those of the first embodiment mode. A major different point between the arrangement of the fifth embodiment mode and the arrangement of the first embodiment mode is such that the service relaying apparatus 101 is no longer required. First, a usable mode directed to this embodiment mode is identical to that of the first embodiment mode.

Next, operations of this embodiment mode will now be described.

Both the reproducing apparatus 102 and the control apparatus 105 directly derive the contents data 110, and execute a subsequent process operation of this contents data 110, different from the first embodiment mode in which the contents data 110 is derived via the network interfaces 116a/116b and the communication path 112.

It should also be noted that the format of the compressed moving picture data usable in this fifth embodiment mode is identical to the format of the compressed moving picture data usable in the first embodiment mode.

Similar to the first embodiment mode, in the picture data relaying apparatus 103 according to this embodiment mode, the video memory may be replaced by a semiconductor memory such as a DRAM, or a storage apparatus such as a magnetic disk apparatus.

As previously explained, in accordance with this fifth embodiment mode, since the contents data saved in the service providing apparatus 109, namely the still picture data formatted by the JPEG system is converted into the compressed moving picture data, this still picture can be displayed by employing the terminal 106 which does not have the still picture display function. Also, since the compressed moving picture data is produced by the stepwise image quality complementing method, the still picture can be displayed with having the high image quality substantially equal to the original image quality. Furthermore, since the video memory (V-RAM) is employed in the image data relaying apparatus 103, the commercially available still picture display software such as a commercial software product can be utilized, and also such a service relaying apparatus 101 adapted to various data formatted contents data 110 can be readily realized, which may improve practical merits.

Embodiment Mode 6

A sixth embodiment mode of the present invention will now be described with reference to FIG. 24.

Figure 24:
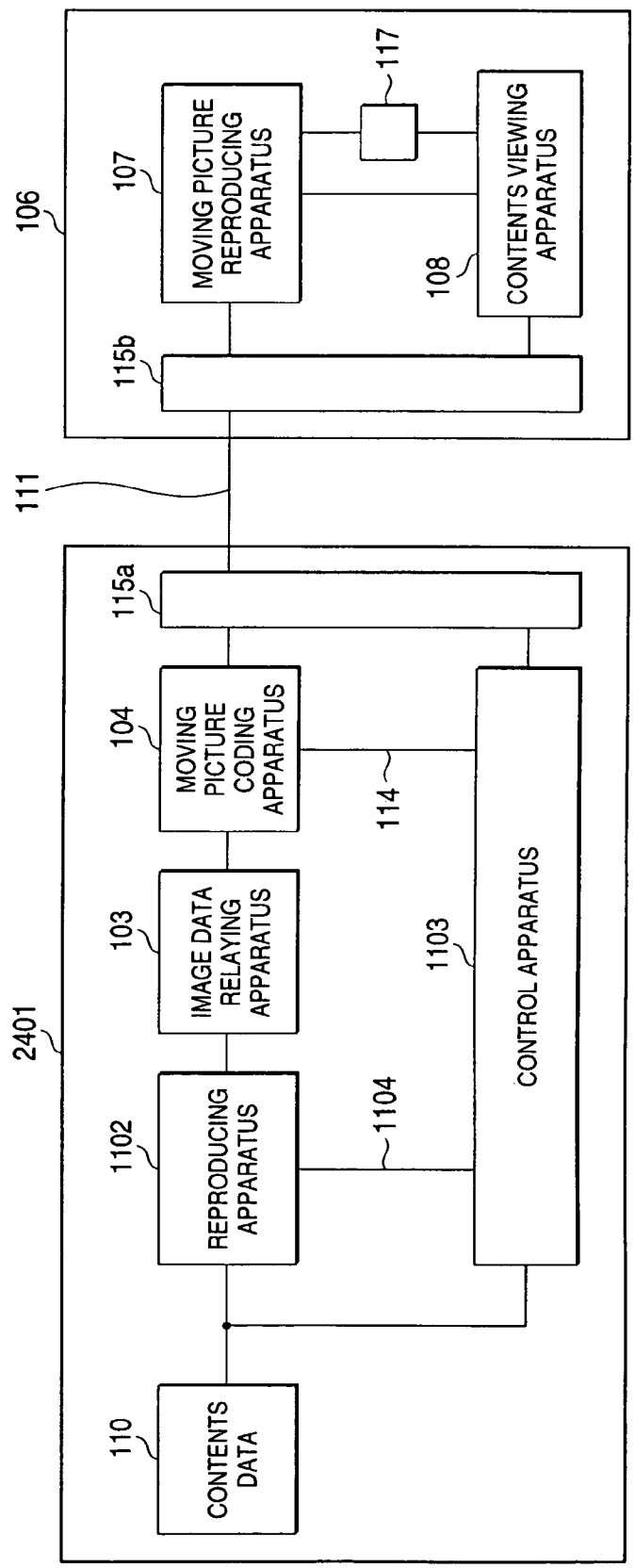
FIG. 24 is a structural diagram for indicating a sixth embodiment mode of the present invention.

FIG. 24 represents a structural diagram of the sixth embodiment mode. In FIG. 24, reference numeral 2401 shows a service providing apparatus. Other structural elements of the sixth embodiment mode are identical to those of the second embodiment mode. A major different point between the arrangement of the sixth embodiment mode and the arrangement of the second embodiment mode is that the service relaying apparatus 1101 is no longer required. First, a usable mode directed to this embodiment mode is identical to that of the second embodiment mode.

Next, operations of this embodiment mode will now be described.

Both the reproducing apparatus 1102 and the control apparatus 1103 directly derive the contents data 110, and execute a subsequent process operation of this contents data 110, different from the second embodiment mode in which the contents data 110 is derived via the network interfaces 116a/116b and the communication path 112.

It can be apparently understood that this sixth embodiment mode may be readily applied to the usable mode directed to the third embodiment mode. It should further be noted that the format of the compressed moving picture data usable in this sixth embodiment mode is identical to the format of the compressed moving picture data usable in the first embodiment mode.

Similar to the first embodiment mode, in the picture data relaying apparatus 103 according to this embodiment mode, the video memory may be replaced by a semiconductor memory such as a DRAM, or a storage apparatus such as a magnetic disk apparatus.

As previously described, in accordance with this sixth embodiment mode, since the contents data 110 saved in the service providing apparatus 109, namely the home page described in the HTML, is converted into the compressed moving picture data, this contents data 110 can be displayed by such a terminal 106 having no function capable of displaying this data (HTML). Also, with respect to the contents data 110 under display, the terminal 106 can perform the following operations, namely, the entire area of this contents data 110 is displayed and an arbitrary data portion thereof is displayed in an enlarge manner; the contents data 110 is moved along the upper/lower/right/left directions (scroll display); and the displayed content of the contents data 110 is changed by using the link information (URL) contained in this contents data 110.

Embodiment 7

A seventh embodiment mode of the present invention will now be described with reference to FIG. 25.

Figure 25:
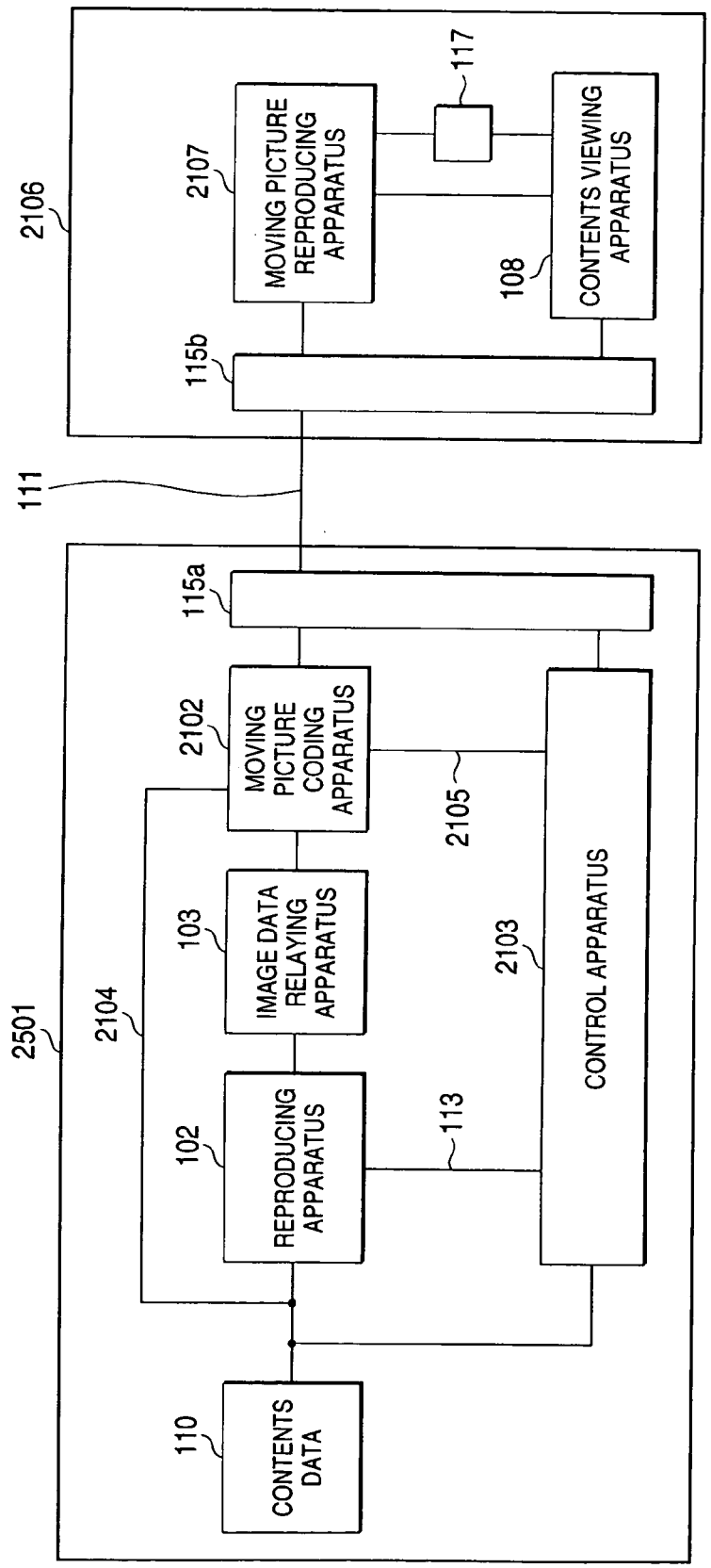
FIG. 25 is a structural diagram for indicating a seventh embodiment mode of the present invention.
Figure 26:
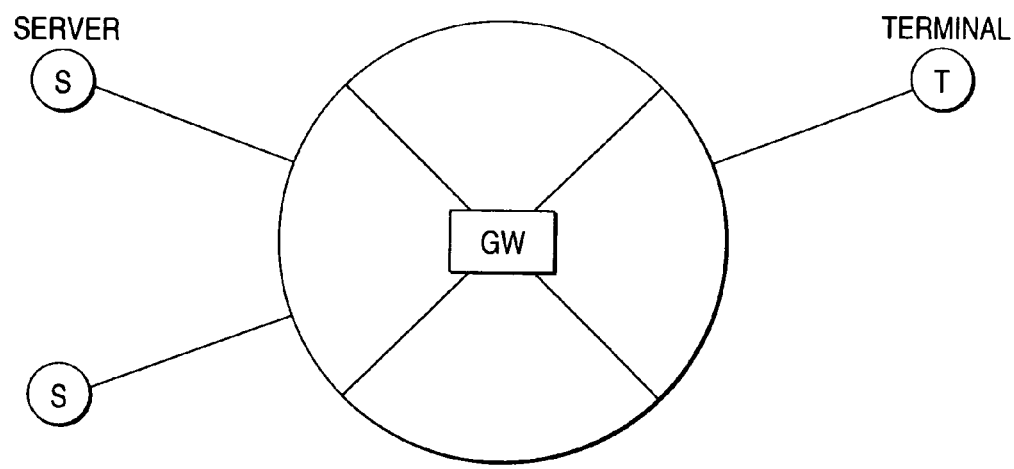
FIG. 26 is an illustrative diagram of a network infrastructure in the first to fourth embodiment modes of the present invention.
Figure 27:
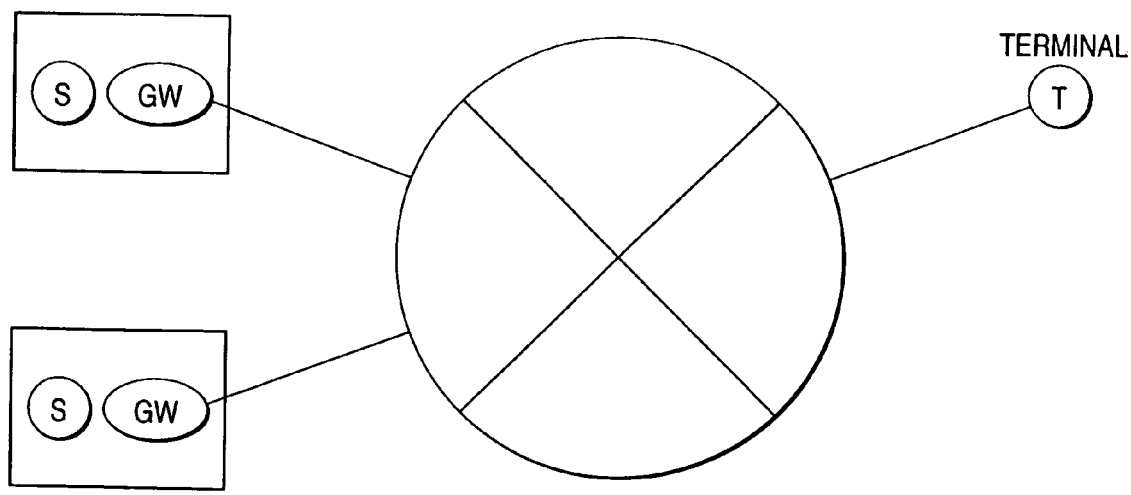
FIG. 27 is an illustrative diagram of a network infrastructure in the fifth to seventh embodiment modes of the present invention.
Figure 28:
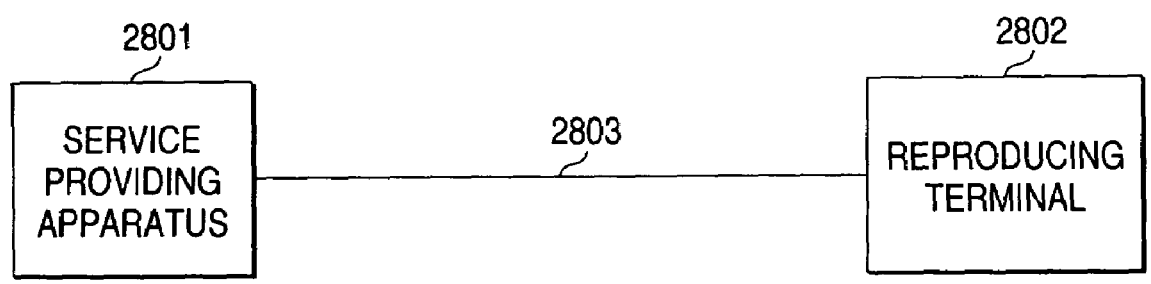
FIG. 28 is a structural diagram for showing a general-purpose information providing apparatus.

FIG. 25 represents a structural diagram of the seventh embodiment mode. In FIG. 25, reference numeral 2501 shows a service providing apparatus. Other structural elements of the seventh embodiment mode are identical to those of the fourth embodiment mode. A major different point between the arrangement of the seventh embodiment mode and the arrangement of the fourth embodiment mode is that the service relaying apparatus 2101 is no longer required. First, a usable mode directed to this embodiment mode is identical to that directed to the fourth embodiment mode.

Next, operations of this embodiment mode will now be described.

Both the reproducing apparatus 102 and the control apparatus 2103 directly derive the contents data 110, and execute a subsequent process operation of this contents data 110, different from the fourth embodiment mode in which the contents data 110 is derived via the network interfaces 116a/116b and the communication path 112.

It should also be noted that the format of the compressed moving picture data usable in this seventh embodiment mode is identical to the format of the compressed moving picture data usable in the first embodiment mode.

Similar to the first embodiment mode, in the picture data relaying apparatus 103 according to this seventh embodiment mode, the video memory may be replaced by a semiconductor memory such as a DRAM, or a storage apparatus such as a magnetic disk apparatus.

As previously described, in accordance with this embodiment mode, since the contents data 110 saved in the service providing apparatus 109, namely the still picture data having the audio data, is converted into the multiplexed AV data, this contents data 110 can be displayed by such a terminal 106 having no function capable of displaying this still picture data. As a consequence, there is a great practical merit.

It should also understood that in the embodiment modes 1 to 4 of the present invention, the service providing apparatus 109 (server "S") is separated from the service relaying apparatus 101 (gateway GW) (referred to as a "first mode" hereinafter), whereas in the embodiment modes 5 to 7 of the present invention, both the service providing apparatus 109 and the service relaying apparatus 101 are arranged in an integral form (will be referred to as a "second mode" hereinafter). In other words, as the first mode, the following cases may be conceived. Namely, while a large number of servers are provided, if the gateways GWs are provided with the respective servers S, then the efficiency of this structure will become insufficient in view of the construction cost. Also, an industry who may provide a network infrastructure installs a gateway GW by herself (see FIG. 26). Furthermore, as the second mode, the following cases may be conceived. Namely, the gateways GWs are provided with the severs S respectively. Also, an industry who may provide a network infrastructure does not install a gateway GW by herself (see FIG. 27). The present invention may provide optimum system modes in correspondence with these conditions.

As previously described, in accordance with the present invention, firstly, the service relaying apparatus is arranged by employing:

the service providing apparatus for storing thereinto a plurality of contents data and capable of transmitting the desirable contents data via the network interface in response to the request;

the moving picture coding apparatus for producing the compressed moving picture data having the high image quality from the still picture data by executing the stepwise image quality complementary type coding operation, and capable of transmitting the compressed moving picture data having the high image quality via the second network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus; and the control means for determining the area of the still picture data coded into the compressed moving picture data in response to the manipulation made from the reproducing terminal, and capable of notifying the determined area to the moving picture coding apparatus.

As a result, the desirable contents data can be reproduced by such a reproducing terminal which does not have the capability of displaying the desirable contents data. In addition, the reproducing terminal can display an arbitrarily selected portion of contents data displayed on this reproducing terminal in an enlarging manner.

As previously described, in accordance with the present invention, secondly, the service relaying apparatus is arranged by employing:

the service providing apparatus for storing thereinto a plurality of contents data and capable of transmitting the desirable contents data via the network interface in response to the request;

the moving picture coding apparatus for producing the compressed moving picture data having the high image quality from the still picture data by executing the stepwise image quality complementary type coding operation, for producing the compressed moving picture data from such a still picture data whose content is sequentially changed by changing the setting condition of the coding process operation, if necessary, and also capable of transmitting the compressed moving picture data having the high image quality via the second network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus; and the control means for producing the control signal used to change the display condition of the reproducing apparatus to transmit the control signal to the reproducing apparatus, and for determining the area of the still picture data coded into the compressed moving picture data in response to the manipulation made from the reproducing terminal, and also capable of notifying the determined area to the moving picture coding apparatus.

As a result, the desirable contents data can be reproduced by such a reproducing terminal which does not have the capability of displaying the desirable contents data. In addition, the reproducing terminal can display an arbitrarily selected portion of contents data displayed on this reproducing terminal in an enlarging manner. Also, the reproducing terminal can move the displayed content along the upper/lower/right/left directions, and can display the relevant contents data by arbitrarily selecting the displayed link information.

As previously described, in accordance with the present invention, thirdly, the service relaying apparatus is arranged by employing:

the service providing apparatus for storing thereinto a plurality of contents data and capable of transmitting the desirable contents data via the network interface in response to the request;

the moving picture coding apparatus for producing the compressed moving picture data having the high image quality from the still picture data by executing the stepwise image quality complementary type coding operation, capable of producing the audio data having the designated format from such an audio data contained in the contents data, and for multiplexing the compressed moving picture data with the audio data to thereby produce the multiplexed AV data, and also capable of transmitting the multiplexed AV data having the high image quality via the second network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus; and the control means for determining the area of the still picture data coded into the compressed moving picture data in response to the manipulation made from the reproducing terminal, and capable of notifying the determined area to the moving picture coding apparatus.

As a result, the desirable contents data can be reproduced by such a reproducing terminal which does not have the capability of displaying the desirable contents data, while reproducing the audio. In addition, the reproducing terminal can display an arbitrarily selected portion of contents data displayed on this reproducing terminal in an enlarging manner.

As previously described, in accordance with the present invention, fourthly, the service relaying apparatus is arranged by employing:

the moving picture coding apparatus for producing the compressed moving picture data having the high image quality from the still picture data by executing the stepwise image quality complementary type coding operation, and capable of transmitting the compressed moving picture data having the high image quality via the network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus;

the control means for determining the area of the still picture data coded into the compressed moving picture data in response to the manipulation made from the reproducing terminal, and capable of notifying the determined area to the moving picture coding apparatus; and the service providing apparatus for storing thereinto a plurality of contents data and capable of transmitting the desirable contents data via the network interface in response to the request.

As a result, the desirable contents data can be reproduced by such a reproducing terminal which does not have the capability of displaying the desirable contents data. In addition, the reproducing terminal can display an arbitrarily selected portion of contents data displayed on this reproducing terminal in an enlarging manner.

As previously described, in accordance with the present invention, fifthly, the service relaying apparatus is arranged by employing:

the moving picture coding apparatus for producing the compressed moving picture data having the high image quality from the still picture data by executing the stepwise image quality complementary type coding operation, for producing the compressed moving picture data from such a still picture data whose content is sequentially changed by changing the setting condition of the coding process operation, if necessary, and also capable of transmitting the compressed moving picture data having the high image quality via the network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus;

the control means for producing the control signal used to change the display condition of the reproducing apparatus to transmit the control signal to the reproducing apparatus, and for determining the area of the still picture data coded into the compressed moving picture data in response to the manipulation made from the reproducing terminal, and capable of notifying the determined area to the moving picture coding apparatus; and the service providing apparatus for storing thereinto a plurality of contents data and capable of transmitting the desirable contents data via the network interface in response to the request.

As a result, the desirable contents data can be reproduced by such a reproducing terminal which does not have the capability of displaying the desirable contents data. In addition, the reproducing terminal can display an arbitrarily selected portion of contents data displayed on this reproducing terminal in an enlarging manner. Also, the reproducing terminal can move the displayed content along the upper/lower/right/left directions, and can display the relevant contents data by arbitrarily selecting the displayed link information.

As previously described, in accordance with the present invention, sixthly, the service relaying apparatus is arranged by employing:

the moving picture coding apparatus for producing the compressed moving picture data having the high image quality from the still picture data by executing the stepwise image quality complementary type coding operation, capable of producing the audio data having the designated format from such an audio data contained in the contents data, and for multiplexing the compressed moving picture data with the audio data to thereby produce the multiplexed AV data, and capable of transmitting the compressed moving picture data having the high image quality via the network interface to the reproducing terminal;

the picture data relaying means capable of utilizing the contents data reproducing software operated on a general-purpose personal computer as the reproducing apparatus, and for relaying to the moving picture coding apparatus, the still picture data originated from the contents data which is obtained by reproducing the contents data acquired from the service providing apparatus via the network interface by this reproducing apparatus;

the control means for determining the area of the still picture data coded into the compressed moving picture data in response to the manipulation made from the reproducing terminal, and capable of notifying the determined area to the moving picture coding apparatus; and the service providing apparatus for storing thereinto a plurality of contents data and capable of transmitting the desirable contents data via the network interface in response to the request.

As a result, the desirable contents data can be reproduced by such a reproducing terminal which does not have the capability of displaying the desirable contents data, while reproducing the audio. In addition, the reproducing terminal can display an arbitrarily selected portion of contents data displayed on this reproducing terminal in an enlarging manner.

What is claimed is:

1. An information providing apparatus for acquiring contents data representing a high quality still image from a service providing apparatus capable of storing the contents data and of transmitting the contents data in response to a request from a remote user terminal, and for providing the contents data to the remote user terminal, said information providing comprising:

reproducing means for reproducing the contents data;

picture data relaying means for relaying still picture data obtained from the contents data reproduced by the reproducing means;

moving picture coding means for producing compressed moving picture data having a high image quality by transforming still picture data coded using a still picture coding format into said compressed moving picture data coded using a moving picture coding format, said still picture data being obtained from said picture data relaying means, wherein said producing utilizes a stepwise image quality complementary type coding system for complementing an image quality in a stepwise manner, and wherein said moving picture coding means is also for transmitting the compressed moving picture data to the user terminal to display a still display picture using said moving picture coding format; and control means for determining an area of the still picture data coded into the compressed moving picture data in response to a user selection of a portion of the still display picture made from the remote user terminal, and for notifying the selected area to the moving picture coding means.

2. An information providing apparatus as claimed in claim 1, wherein said control means is capable of producing a control signal used to change the reproducing state of the reproducing means by receiving a manipulation of the user terminal, and is capable of transmitting the control signal to the reproducing means; and wherein the moving picture coding means produces compressed moving picture data from said still picture data, the content of which is sequentially changed by changing a setting condition of a coding process operation.

3. An information providing apparatus as claimed in claim 1, wherein the moving picture coding means also produces audio data having a designated data format from audio data contained in the contents data, and also produces multiplexed AV data by multiplexing the compressed moving data with the audio data, and transmits the multiplexed AV data to the user terminal.

4. An information providing apparatus for providing data to a remotely located user terminal in response to a request, comprising:

storing means for storing contents data including still picture data;

reproducing means for reproducing the contents data;

picture data relaying means for relaying the still picture data originated from the contents data reproduced by the reproducing means;

moving picture coding means for producing compressed moving picture data having a high image quality by transforming the still picture image data coded using a still picture coding format into said compressed moving picture data coded using a moving picture coding format, wherein said producing utilizes a stepwise image quality complementary type coding system for complementing an image quality in a stepwise manner, and wherein said moving picture coding means is also for transmitting the compressed moving picture data to the remotely located user terminal for displaying a still display image using said moving picture coding format; and control means for determining an area of still picture data coded into the compressed moving picture data in response to a user selection of a portion of the still display image made from the remote user terminal, and for notifying the selected area to the moving picture coding means.

5. An information providing apparatus as claimed in claim 4, wherein said control means is also for producing a control signal used to change the reproducing state of the reproducing means by receiving a manipulation of the user terminal, and is further for transmitting the control signal to the reproducing means; and wherein the moving picture coding means produces compressed moving picture data from the still picture data, the content of which is sequentially changed by changing a setting condition of coding process operation.

6. An information providing apparatus as claimed in claim 4, wherein the moving picture coding means also produces audio data having a designated data format from audio data contained in the contents data, and also produces multiplexed AV data by multiplexing the compressed moving picture data with the audio data, and also transmits the multiplexed AV data to the user terminal.

7. An information providing system for acquiring content data from a service providing system and for providing a communication service to a remotely located mobile terminal, wherein the content data represents a high quality still image coded using a still picture coding format, said information providing system comprising:

moving picture coding means for producing compressed moving picture data by transforming said still coding picture format of the content data into said compressed moving picture data coded using a moving picture coding format and using a stepwise image quality complementary coding system; and transmitting means for transmitting the compressed moving picture data to the mobile terminal, wherein the mobile terminal displays a still display image representing the high quality still image from the compressed moving picture data using said moving picture coding format, such that image processing of the content data is primarily conducted by the information providing system to thereby reduce a processing load and/or a memory requirement on the mobile terminal.

8. The system of claim 7, wherein the mobile terminal displays the display image in progressively more detail over some period of time.

9. The system of claim 7, wherein the mobile terminal is a mobile terminal capable of displaying compressed moving picture images.

10. The system of claim 9, wherein the mobile terminal is a PDA or a portable telephone.

11. The system of claim 7, wherein the mobile terminal is a PDA or a portable telephone.

12. The system of claim 7, further comprising control means for determining an area of a portion of the display image, wherein the portion is chosen by a user manipulation at the mobile terminal, and wherein the control means provides the determined area to the moving picture coding means.

13. An information providing system for acquiring content data from a service providing system and for providing a communication service to a remotely located mobile terminal capable of displaying compressed moving picture data and connected to a communication network, wherein the content data represents a high quality still image coded using a still picture coding format, said information providing system comprising:

moving picture coding means for producing compressed moving picture data coded using a moving picture coding format by transforming the content data coded using the still picture coding format into the moving picture data coded using a moving picture coding format, and using a stepwise image quality complementary coding system; and transmitting means for transmitting the compressed moving picture data to the mobile terminal via the communication network such that image processing is conducted at the information providing system to thereby reduce a processing load and/or a memory requirement on the mobile terminal, and wherein the mobile terminal displays a still display image representing the high quality still image from the compressed moving picture data using said moving picture coding format.

14. The system of claim 13, wherein the mobile terminal is a PDA or a portable telephone.

15. The system of claim 13, wherein the mobile terminal displays the still display image in progressively more detail over some period of time.

16. The system of claim 13, further including control means for determining an area of a portion of the display image, wherein the portion is chosen by a user manipulation at the mobile terminal, and wherein the control means provides the determined area to the moving picture coding means, which then produces new compressed moving picture data from the content data using the stepwise image quality complementary coding system, wherein the new compressed moving picture data corresponds to the chosen portion of the display image for displaying the chosen portion on the mobile device in a larger fashion.

17. A system comprising:

a mobile terminal including telephone capability for connecting to a telephone network and capable of displaying compressed moving picture data;

a service providing system for providing content data representing a high quality still image coded using a still picture coding format as a service; and an information providing system for acquiring the content data from the service providing system and for providing a communication service to the mobile terminal, said information providing system including:

moving picture coding means for producing compressed moving picture data coded using a moving picture coding format by transforming the content data coded using the still picture coding format into the moving picture coding data coded using the moving picture coding format, and for providing compressed moving picture data to the mobile terminal for display on the mobile terminal, transmitting means for transmitting the compressed moving picture data to the mobile terminal, wherein the mobile terminal displays a still display image representing the high quality still image from the compressed moving picture data using said moving picture coding format, control means for determining an area of the still picture data coded into the compressed moving picture data in response to a user selection of a portion of the still display image from the user terminal, and for notifying the selected area to the moving picture coding means, wherein the moving picture coding means then produces new compressed moving picture data from the content data corresponding to the user selected portion of the display image for displaying the selected portion on the mobile terminal in a larger fashion as a zoomed still image; wherein the information providing system operates such that a primary portion of image processing of the content data is conducted at the information providing system to thereby reduce a processing load and/or a memory requirement on the mobile terminal.

* * * * *